(12) United States Patent
Liu et al.

(10) Patent No.: US 11,016,361 B2
(45) Date of Patent: May 25, 2021

(54) MONOLITHIC ELECTRO-OPTICAL MODULATOR HAVING RCBC ELECTRODE STRUCTURE

(71) Applicant: SiFotonics Technologies Co., Ltd., Grand Cayman (KY)

(72) Inventors: Yadong Liu, Beijing (CN); Tzung-I Su, Taoyuan (TW); Pengfei Cai, Beijing (CN); Dong Pan, Andover, MA (US)

(73) Assignee: SiFotonics Technologies Co., Ltd.

( * ) Notice: Subject to any disclaimer, the term of this patent is extended or adjusted under 35 U.S.C. 154(b) by 0 days.

(21) Appl. No.: 16/557,986

(22) Filed: Aug. 30, 2019

(65) Prior Publication Data

US 2020/0073197 A1    Mar. 5, 2020

Related U.S. Application Data

(60) Provisional application No. 62/765,565, filed on Aug. 31, 2018.

(51) Int. Cl.
| | | |
|---|---|---|
| G02F 1/225 | (2006.01) | |
| G02F 1/025 | (2006.01) | |
| G02F 1/01 | (2006.01) | |
| G02F 1/035 | (2006.01) | |
| G02B 6/12 | (2006.01) | |

(52) U.S. Cl.
CPC ............ *G02F 1/2257* (2013.01); *G02F 1/011* (2013.01); *G02F 1/025* (2013.01); *G02F 1/035* (2013.01); *G02F 1/0356* (2013.01); *G02F 1/2255* (2013.01); *G02B 2006/12142* (2013.01); *G02F 2201/063* (2013.01); *G02F 2202/105* (2013.01); *G02F 2203/50* (2013.01)

(58) Field of Classification Search
CPC ........ G01F 1/015; G01F 1/025; G01F 1/0344; G01F 1/035; G01F 1/2255; G01F 1/2257; G01F 1/0123; G02F 2001/0151–0154; G02F 2201/063; G02F 2202/105
USPC ......................................................... 385/1–3
See application file for complete search history.

(56) References Cited

U.S. PATENT DOCUMENTS

| | | | | |
|---|---|---|---|---|
| 9,841,618 | B1 * | 12/2017 | Poulin ..................... | G02F 1/025 |
| 9,939,667 | B1 * | 4/2018 | El-Moznine .......... | G02F 1/2257 |
| 2007/0003180 | A1 * | 1/2007 | Tanaka .................. | G02F 1/2255 |
| | | | | 385/2 |

(Continued)

*Primary Examiner* — Robert Tavlykaev
(74) *Attorney, Agent, or Firm* — Han IP PLLC; Andy M. Han

(57) ABSTRACT

Various embodiments of a monolithic electro-optical (E-O) modulator are described. The monolithic E-O modulator includes an active region comprising a plurality of p-n junction diodes, as well as a modulation electrode and a bias electrode that extend through the active region. The monolithic E-O modulator further includes a resistor-capacitor-bias-capacitor (RCBC) electrode structure configured to receive an electrical modulation signal, a direct-current (DC) bias voltage and a power supply voltage. Specifically, the RCBC electrode structure includes a resistor coupled to the modulation electrode and two capacitors each coupled to a respective end of the bias electrode. Beneficially, the RCBC electrode structure enables the p-n junction diodes to be biased independently from a DC level of the electrical modulation signal.

20 Claims, 16 Drawing Sheets

(56) References Cited

U.S. PATENT DOCUMENTS

| | | | |
|---|---|---|---|
| 2010/0271144 A1* | 10/2010 | McCorquodale | H03B 5/04 |
| | | | 331/117 FE |
| 2011/0206313 A1* | 8/2011 | Dong | G02F 1/025 |
| | | | 385/2 |
| 2016/0085133 A1* | 3/2016 | Denoyer | G02F 1/2255 |
| | | | 385/3 |
| 2016/0202501 A1* | 7/2016 | Bach | G02F 1/015 |
| | | | 385/2 |
| 2018/0341164 A1* | 11/2018 | Williams | G02F 1/2257 |
| 2019/0072834 A1* | 3/2019 | Kono | G02F 1/2257 |
| 2020/0064707 A1* | 2/2020 | Vitic | G02F 1/2257 |
| 2020/0124883 A1* | 4/2020 | Delisle-Simard | G02F 1/025 |

\* cited by examiner

US 11,016,361 B2

MONOLITHIC ELECTRO-OPTICAL MODULATOR HAVING RCBC ELECTRODE STRUCTURE

CROSS-REFERENCE TO RELATED PATENT APPLICATIONS

The present disclosure claims the priority benefit of U.S. Patent Application No. 62/765,565, filed on Aug. 31, 2018. The aforementioned application is incorporated by reference in its entirety.

TECHNICAL FIELD

The present disclosure relates to the technical field of optical modulators. More particularly, the present disclosure relates to a monolithic electro-optical modulator having a resistor-capacitor-bias-capacitor (RCBC) electrode structure.

BACKGROUND

A monolithic electro-optical (E-O) modulator, such as a miniaturized Mach-Zehnder modulator (MZM) fabricated on a substrate, is a key component in various modern digital communication systems. The substrate is usually a semiconductor substrate such as a silicon (Si) or silicon-on-insulator (SOI) substrate, on which the monolithic E-O modulator is fabricated using fabrication techniques similar to those employed in manufacturing semiconductor integrated circuits (ICs). The monolithic E-O modulator may include various miniaturized optical components, such as waveguides, optical couplers, optical splitters, and/or phase shifters. The monolithic E-O modulator may also include various miniaturized electrical components, such as resistors, capacitors, diodes, and/or electrodes. Both the optical components and the electrical components are fabricated on the same substrate. A monolithic E-O modulator of the present disclosure is hereinafter interchangeably referred as an "E-O modulator", a "photonic modulator", or simply a "modulator".

An optical signal may enter one or more waveguides of a modulator, and the modulator may change an intensity, a phase, or both, of the optical signal as the optical signal propagates through the modulator. Specifically, the amount of change in intensity and/or phase induced therein depends on an electrical modulation voltage applied to the modulator. As a control signal for the modulator, the modulation voltage may include a time-varying radio-frequency (RF) component and a static direct-current (DC) component. The modulation voltage may be provided by an electrical driver circuit that is fabricated on a separate substrate, and not on the same substrate that carries the modulator. The substrate carrying the modulator may be referred as a "modulator die", whereas the substrate carrying the electrical driver may be referred as a "driver die". One or more electrical connections may be employed to electrically couple the driver die to the modulator die so that the electrical driver can "drive" the modulator. That is, the modulation voltage generated by the electrical driver circuit is properly applied to the modulator to control the behavior of the modulator. In particular, the modulator may include an electrode structure, via which the modulation voltage is properly received and applied to the modulator. In addition to receiving the modulation voltage, the electrode structure of the modulator may also receive a bias voltage from a DC power supply that indirectly sets the DC component of the modulation voltage. A combination of a driver die carrying an electrical driver and a modulator die carrying a modulator driven by the electrical driver may be referred as a modulation system.

FIG. 15 illustrates a modulation system 1500, wherein a conventional way for applying a modulation voltage to a modulator is employed. As shown in FIG. 15, the modulation system 1500 includes an electrical driver circuit 1510, located on a driver die 1519, and a modulator 1520, located on a modulator die 1529. The driver die 1519 and the modulator die 1529 are directly coupled to one another via an electrical connection 1541 so that a modulation voltage generated by of the electrical driver circuit 1510 is applied to the modulator 1520. Specifically, a modulation voltage generated by the electrical driver circuit 1510 is presented at an output node 1512 of the electrical driver circuit 1510 and subsequently coupled, via the electrical connection 1541, to a modulation electrode 1521 of the modulator 1520, which interacts with an active region 1524 of the modulator 1520. Namely, via a direct electrical coupling realized by the electrical connection 1541, the electrical driver circuit 1510 is configured to drive the modulation electrode 1521 of the modulator 1520 with the modulation voltage, thereby controlling the modulator 1520 to produce a desired optical modulation according to the modulation voltage.

The modulator 1520 also includes a load resistor 1526 electrically coupled between the modulation electrode 1521 and a power supply 1530. The power supply 1530 is configured to serve as a current source at a rated voltage of value $V_{SP}$. Specifically, the power supply 1530 is configured to supply a current $I_{SP}$ that flows to the electrical driver circuit 1510 through the modulator 1520. Particularly, the current $I_{SP}$ is configured to flow from the power supply 1530, via the load resistor 1526 and the modulation electrode 1521, to the output node 1512 of the electrical driver circuit 1510.

Assuming that the voltage drop across the modulation electrode 1521 is negligible, the nodal voltage of the output node 1512 of the electrical driver circuit 1510, denoted as $V_{OUT}$ in FIG. 15, would be the same as the nodal voltage of the modulation electrode 1521 of the modulator 1520. Namely, the active region 1524 of the modulator 1520 is directly biased by the output node 1512 of the electrical driver circuit 1510 at a voltage level of $V_{OUT}$. However, there may be a conflict between the electrical driver circuit 1510 and the modulator 1520 in terms of a desired value of $V_{OUT}$. That is, while there may be a value of $V_{OUT}$ that is optimal for the operation of the electrical driver circuit 1510, the modulator 1520 may desire $V_{OUT}$ to be at a different value based on its own performance requirements. Consequently, a value of $V_{OUT}$ that is optimal to both the electrical driver circuit 1510 and the modulator 1520 may not exist, and any value of $V_{OUT}$ may comprise performance of either or both of the electrical driver circuit 1510 and the modulator 1520. This dilemma exists for the modulation system 1500 even if a finite voltage drop across the modulation electrode 1521 is included in the consideration. This is because the nodal voltage of the output node 1512 of the electrical driver circuit 1510 and the bias voltage of the active region 1524 of the modulator 1520 are still correlated, and thus cannot be respectively optimized.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

In one aspect, a monolithic electro-optical (E-O) modulator is provided. The monolithic E-O modulator includes an active region that is configured to accommodate an optical wave. The optical wave may propagate through the active region along a main propagation direction. The active region may include a plurality of p-n junction diodes disposed along the main propagation direction. Each of the plurality of p-n junction diodes may have a p-type stripe and a n-type stripe. The p-type stripe and a n-type stripe are disposed adjacent to one another along the main propagation direction, forming a p-n junction in between. The modulation electrode is electrically coupled to the n-type stripe of each of the plurality of p-n junction diodes, whereas the bias electrode is electrically coupled to the p-type stripe of each of the plurality of p-n junction diodes.

The monolithic E-O modulator may also include a modulation electrode and a bias electrode. Each of the modulation electrode and the bias electrode may extend through the active region along the main propagation direction.

Additionally, the monolithic E-O modulator may also include a radio-frequency (RF) input interface, a direct-current (DC) bias interface, and a power supply interface. The RF input interface is configured to receive an electrical modulation signal, whereas the DC bias interface is configured to receive a DC bias voltage. The power supply interface is configured to receive a power supply voltage.

A few passive electrical devices are also included in the monolithic E-O modulator. Specifically, a resistor and two capacitors are included in the monolithic E-O modulator.

Various components of the monolithic E-O modulator are additionally connected in the following ways: (1) the RF input interface is electrically coupled to a first end of the modulation electrode; (2) the DC bias interface is electrically coupled to the bias electrode; (3) the resistor is electrically coupled between a second end of the modulation electrode and the power supply interface; (4) a first capacitor of the two capacitors is electrically coupled between a first end of the bias electrode and an electrical ground; and (5) a second capacitor of the two capacitors is electrically coupled between a second end of the bias electrode and the power supply interface.

In some embodiments, the monolithic E-O modulator may also include a voltage generation circuit that generates the DC bias voltage. In some embodiments, the voltage generation circuit is capable of adjusting the DC bias voltage over a range of value.

In some embodiments, the monolithic E-O modulator may be fabricated on a silicon-on-insulator substrate. The silicon-on-insulator substrate may include a bulk silicon substrate, a buried oxide layer, and a top silicon layer.

In some embodiments, the plurality of p-n junction diodes collectively forms a ridge waveguide, and the optical wave is configured to travel within the ridge waveguide.

In some embodiments, the bias electrode may include two conductive stripes. The two conductive stripes are disposed in parallel to one another while being aligned with the main propagation direction. Each of the two conductive stripes is disposed on a respective side of the modulation electrode. Also, a coplanar waveguide electrode is formed by the modulation electrode and the two conductive stripes of the bias electrode. The electrical modulation signal, which may be generated by an electrical driver circuit, may conduct in the coplanar waveguide electrode.

In some embodiments, the E-O modulator may be driven by a pair of differential modulation signals. The modulation electrode may include two conductive stripes, each carrying one of the pair of differential modulation signals. Meanwhile, the bias electrode may have three conductive stripes. In terms of physical placement or layout, the three conductive stripes of the bias electrode and the two conductive stripes of the modulation electrode are disposed in parallel to each other and aligned with the main propagation direction. Specifically, the two conductive stripes of the modulation electrode are interdigital among the three conductive stripes of the bias electrode to form a coplanar waveguide electrode, and the coplanar waveguide electrode can be used to carry the pair of differential modulation signals in a balanced fashion. The plurality of the p-n junction diodes may be arranged to be symmetrical with respect to the coplanar waveguide electrode.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure. The drawings may not necessarily be in scale so as to better present certain features of the illustrated subject matter. The left-most digit(s) of a reference number identifies the figure in which the reference number first appears. The use of the same reference numbers in different figures indicates similar or identical items.

DETAILED DESCRIPTION OF THE PREFERRED EMBODIMENTS

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

As described above, a dilemma exists in a conventional configuration of driving an electro-optical (E-O) modulator by directly coupling a modulation voltage from a driver circuit to a modulation electrode of the modulator. The configuration causes an active region of the modulator to be directly biased by a voltage generated by the driver circuit (i.e., the modulation voltage), resulting in compromised performance in either or both of the driver circuit and the modulator.

The present disclosure advocates an E-O modulator having a novel electrode structure called a resistor-capacitor-bias-capacitor (RCBC) electrode structure. Thanks to the RCBC electrode structure, the active region of the modulator may be biased at a voltage that is different from the DC component of the modulation voltage at the output node of the driver circuit. Consequently, the electrical performance of the driver circuit and the optical performance of the modulator may be decoupled and individually optimized. The RCBC electrode structure and various modulator configurations having the RCBC electrode structure are presented using the following example embodiments.

First Embodiment

Figure 1:
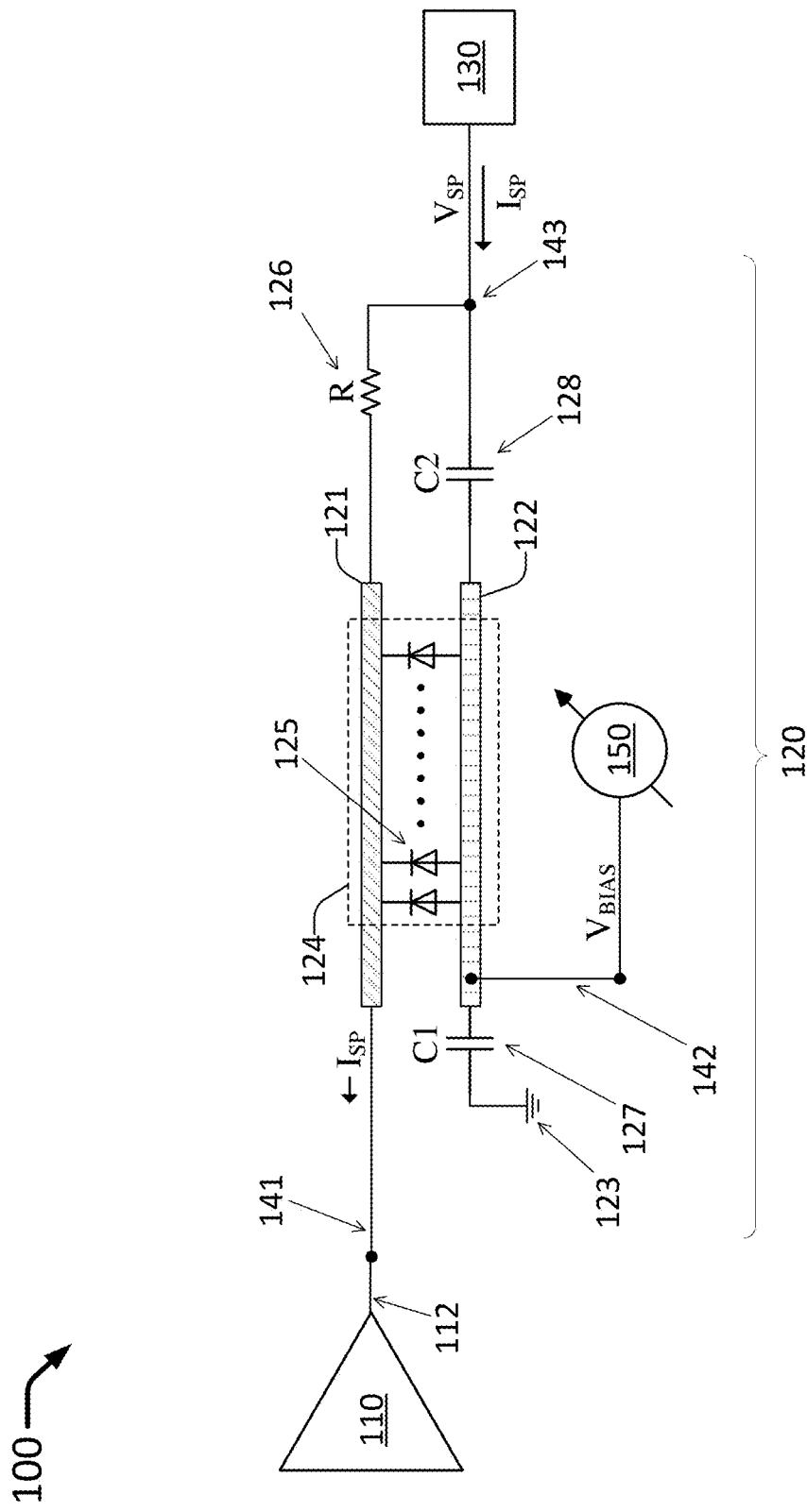
FIG. 1 is a schematic diagram of a modulation system having an electro-optical (E-O) modulator in accordance with a first embodiment of the present disclosure.

FIG. 1 illustrates a schematic diagram related to an E-O modulator having a RCBC electrode structure. Specifically, FIG. 1 shows a modulation system 100 that includes an electrical driver circuit 110, an E-O modulator 120, and a power supply 130. The RCBC electrode of the modulator 120 includes a resistor 126, a first capacitor 127, a bias electrode 122, and a second capacitor 128.

As shown in FIG. 1, the modulator 120 includes an active region 124, which is configured to accommodate an optical wave as the optical wave propagates or otherwise passes through the active region 124 along a main propagation direction. The active region 124 may include one or more optical waveguides to accommodate the optical wave. Namely, the one or more optical waveguides provide an optical path within which the optical wave passes through the active region 124. As the optical wave propagates through the active region 124, the E-O modulator 120 is configured to change an intensity and/or a phase of the optical wave based on an electrical modulation signal generated by the electrical driver circuit 110, The modulator 120 includes a modulation electrode 121 to receive the electrical modulation signal from the electrical driver circuit 110. The modulation voltage may include a time-varying RF component and a static DC component. The electrical modulation signal is generated by the electrical driver circuit 110 and presented at an output node 112 of the electrical driver circuit 110. The modulator 120 includes a radio-frequency (RF) input interface 141 that is configured to receive the electrical modulation signal. The RF input interface 141 is electrically coupled to the modulation electrode 121. In some embodiments, the RF input interface 141 may be an extension of the modulation electrode 121, and the electrical modulation signal may be directly coupled to the modulation electrode 121 from the output node 112 of the electrical driver circuit 110. Physically, the modulation electrode 121 may extend through the active region 124 along the main propagation direction.

The modulator 120 also includes a DC bias interface 142 that is configured to receive a DC bias voltage, denoted as $V_{BIAS}$ in FIG. 1. The DC bias interface 142 is electrically coupled to the bias electrode 122. In some embodiments, the DC bias interface 142 may be an extension of the bias electrode 122, and the DC bias voltage may be directly coupled to the bias electrode 122 from a voltage source. Physically, the bias electrode 122 may extend through the active region 124 along the main propagation direction. In some embodiments, the modulator 120 may include the voltage source, e.g., a voltage generation circuit 150 which generates the DC bias voltage $V_{BIAS}$. In some embodiments, the voltage generation circuit 150 is configured to provide a variable DC bias voltage. That is, the voltage generation circuit 150 may be capable of adjusting a value of the DC bias voltage $V_{BIAS}$ over a range depending on performance requirements of the modulator 120.

The modulator 120 also includes a power supply interface 143 that is configured to receive a power supply voltage, denoted as $V_{SP}$ in FIG. 1, which is also a DC voltage. The power supply voltage may be generated by a power supply 130. The power supply 130 is configured to serve as a current source at a rated voltage of value $V_{SP}$. Specifically, the power supply 130 is configured to supply a current of value $I_{SP}$ that flows to the electrical driver circuit 110 through the modulator 120. Particularly, the current $I_{SP}$ is configured to flow from the power supply 130, via the load resistor 126 and the modulation electrode 121, to the output node 112 of the electrical driver circuit 110. In general, for modern digital communication systems, the power supply voltage $V_{SP}$ has a value in a range of 4-6 volts.

The resistor 126, denoted as R in FIG. 1, is electrically coupled between the modulation electrode 121 and the power supply interface 143, and may be referred as a "load resistor" to the modulation electrode 121. Specifically, the load resistor 126 and the RF input interface 141 are respectively coupled to the two opposing ends of the modulation electrode 121. That is, the RF input interface 141 is coupled to a first end of the modulation electrode 121, whereas the load resistor 126 is coupled to a second end of the modulation electrode 121. The load resistor may serve to absorb residual RF power of the electrical modulation signal as the electrical modulation signal propagates to a far end of the modulation electrode 121 (i.e., the end to which the load resistor is coupled). An actual value of the resistor 126 may be determined such that a microwave reflection at the far end is minimized or reduced. For E-O modulators used in contemporary digital communication systems, the actual value of the resistor 126 may be in a range of 30-50 ohms.

The capacitors 127 and 128, respectively denoted as C1 and C2 in FIG. 1, are electrically coupled to the two opposing ends of the bias electrode 122, respectively. In particular, the capacitor 127 is electrically coupled between a first end of the bias electrode 122 and an electrical ground 123 of the modulator 120, whereas the capacitor 128 is electrically coupled between a second end of the bias electrode 122 and the power supply interface 143. Each of the capacitors 127 and 128 may be referred as an "isolation capacitor" to the bias electrode 122. Through the capacitors 127 and 128, the bias electrode 122 is largely isolated from electrical noises or disturbances in the ambient environment, and thus is properly biased at the DC bias voltage $V_{BIAS}$. Various electrical voltages of the modulation system 100, including the power supply voltage $V_{SP}$, the DC bias voltage $V_{BIAS}$, and the electrical modulation signal generated by the driver circuit 110, are all referred to the electrical ground 123.

The optical path formed by the one or more optical waveguides of the active region 124 allows the optical wave to propagate through the active region 124 along the main propagation direction. The optical path is unidirectional. That is, the optical wave enters from one end of the active region 124, travels within the one or more optical waveguides substantially along the main propagation direction, and exits from the other end of the active region 124. In some embodiments, the optical path may be substantially straight. In some other embodiments, the optical path may be winding, or may contain a curved portion. In some embodiments, each of the one or more optical waveguides may have a cross section (i.e., perpendicular to the main propagation direction) that is of a constant size along the optical path. In some embodiments, the size of the cross section may be varying along the optical path. The modulation electrode 121 and/or the bias electrode 122 may be disposed alongside the one or more optical waveguides.

Figure 2:
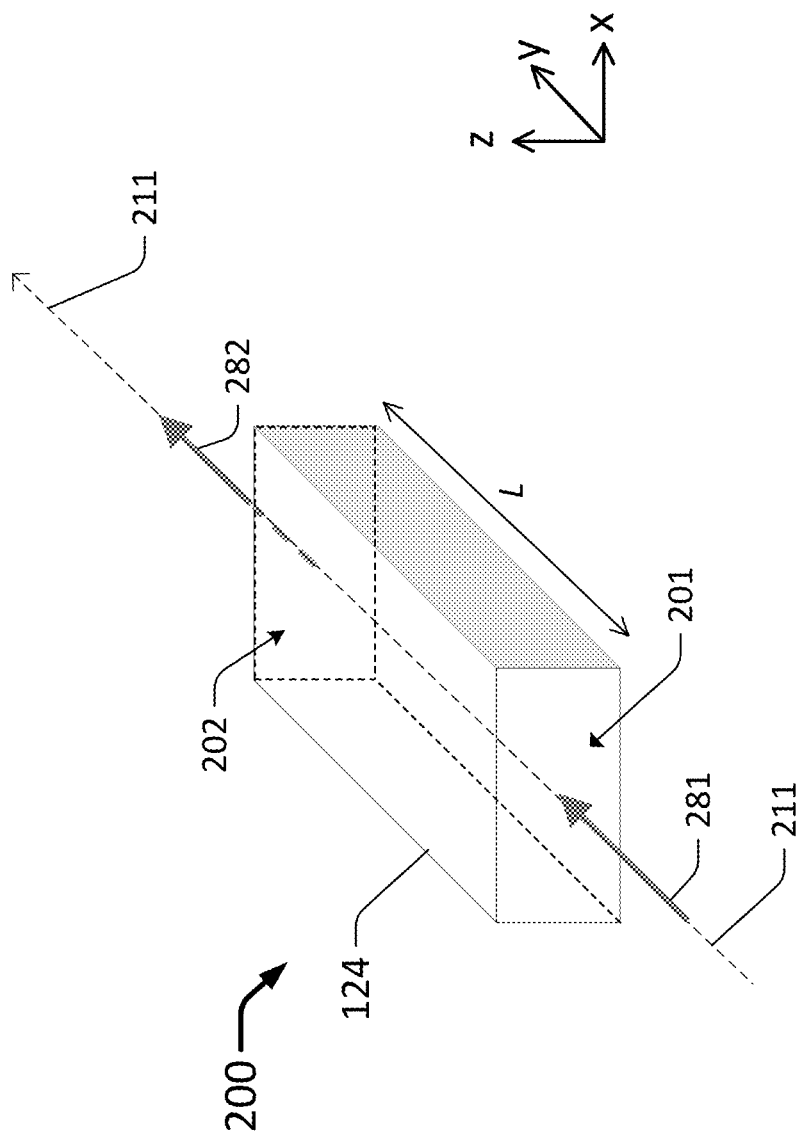
FIG. 2 illustrates a perspective view of an active region of an E-O modulator in accordance with an embodiment of the present disclosure.

FIG. 2 illustrates a perspective view 200 of the active region 124, as well as an optical wave passing through the active region 124, wherein the active region 124 is essentially a slab. An arrow 281 represents the optical wave as it enters the active region 124 at a front surface 201 of the slab, whereas an arrow 282 represents the optical wave as it exits the active region 124 at a rear surface 202 of the slab. As shown in FIG. 2, the optical wave propagates through the active region 124 along a main propagation direction 211. Using the Cartesian coordinates of FIG. 2, the main propagation direction 211 is substantially aligned with the y-direction. As indicated in the perspective view 200, the active region 124 has a length of L along the main propagation direction 211, as denoted in FIG. 2.

Both the modulation electrode 121 and the bias electrode 122 may extend through the active region 124 along the main propagation direction 211. As described above, each of the modulation electrode 121 and the bias electrode 122 has a first end and a second end. In view of the perspective view 200, each of the modulation electrode 121 and the bias electrode 122 may have the first end at the front surface 201 and the second end at the rear surface 202, and may extend from the first end to the second end through the active region 124 along the main propagation direction 211 for the length of L. In some embodiments, the RF input interface 141 may be electrically coupled to the first end of the modulation electrode 121, whereas the load resistor 126 may be electrically coupled to the second end of the modulation electrode 121. In some embodiments, the first isolation capacitor 127 may be electrically coupled between the first end of the bias electrode 122 and the electrical ground 123, whereas the second isolation capacitor 128 may be electrically coupled between the second end of the bias electrode 122 and the power supply interface 143. In some embodiments, the DC bias interface 142 may also be electrically coupled to the first end of the bias electrode 122.

As shown in FIG. 1, the active region 124 of the modulator 120 includes a plurality of p-n junction diodes 125. The plurality of p-n junction diodes 125 may be sequentially disposed along the main propagation direction 211. Consequently, the optical wave, as represented by the arrow 281, may travel along the main propagation direction 211, passing through a first p-n junction diode of the plurality of p-n junction diodes 125, and subsequently a second p-n junction diode thereof, and subsequently a third p-n junction diode thereof, and so forth, before exiting the active region 124 as represented by arrow 282. Typically, the plurality of p-n junction diodes 125 may include a quantity of up to a hundred p-n junction diodes disposed sequentially. In some embodiments, however, the plurality of p-n junction diodes 125 may include only one p-n junction diode.

Each of the plurality of p-n junction diodes 125 is electrically biased by a voltage difference between the modulation electrode 121 and the bias electrode 122. Due to the DC current $I_{SP}$ that flows through the modulation electrode 121, the modulation electrode 121 has a DC voltage level that is below $V_{SP}$ by a voltage drop across the resistor 126. Namely, the modulation electrode 121 has a DC voltage of $(V_{SP}-I_{SP}*R)$. Given that the bias electrode 122 is biased at the DC bias voltage $V_{BIAS}$, there is thus a voltage difference of an absolute value of $(V_{SP}-I_{SP}*R-V_{BIAS})$ across each of the plurality of p-n junction diodes 125. As described above, an actual value of $V_{BIAS}$ may be adjustable if the voltage generation circuit 150 is a variable voltage source. Accordingly, the bias voltage across the plurality of p-n junction diodes 125 is adjustable through adjusting the actual value of $V_{BIAS}$ generated by the voltage generation circuit 150.

Figure 3:
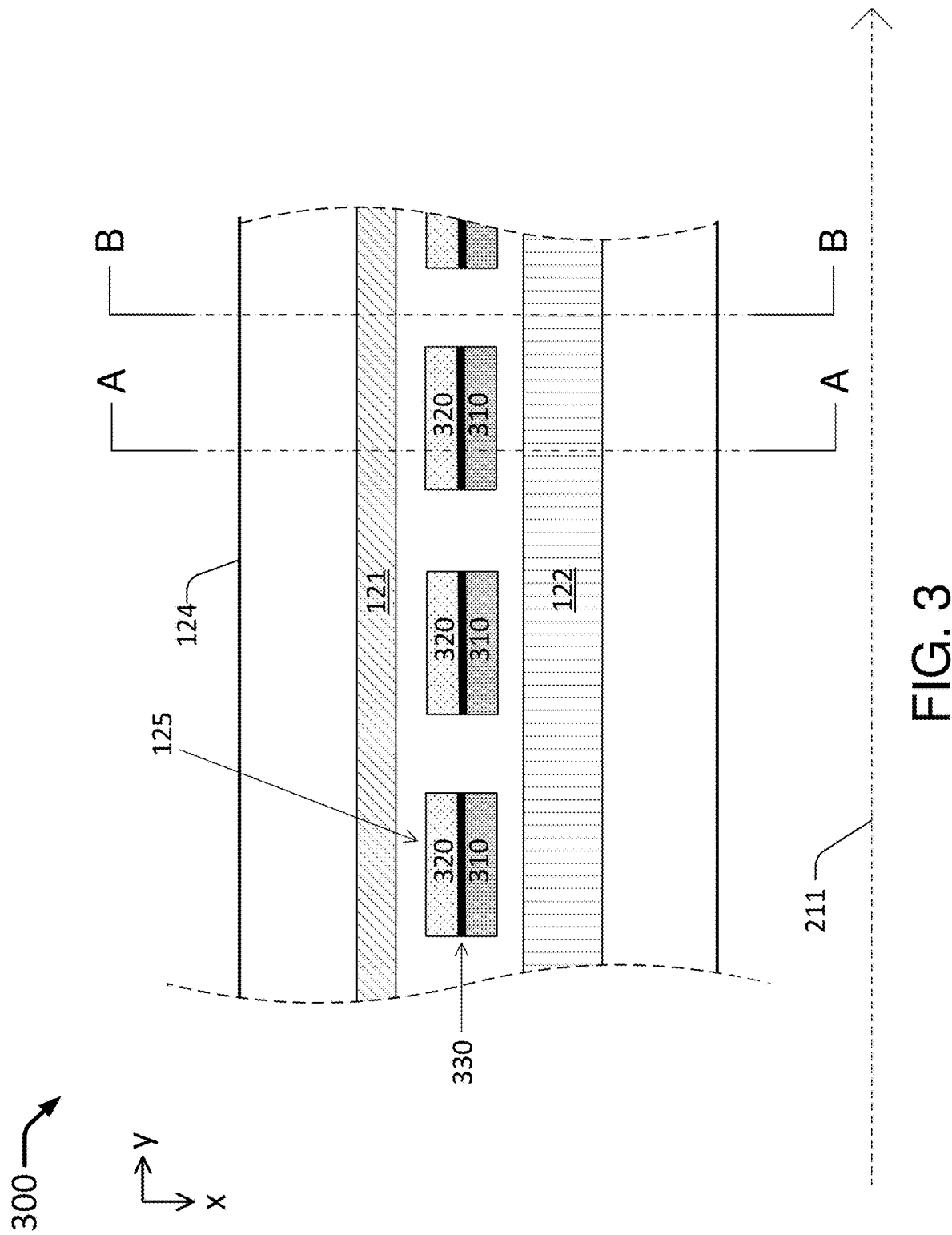
FIG. 3 illustrates a cross-sectional view of an active region of an E-O modulator in accordance with a first embodiment of the present disclosure.

FIG. 3 illustrates a cross-sectional view 300 of the active region 124 along the main propagation direction 211. Specifically, the cross-sectional view 300 reveals a cross section that is parallel to the x-y plane of FIG. 2. Some of the plurality of p-n junction diodes 125 are shown, along with a portion of the modulation electrode 121 and a portion of the bias electrode 122. As shown in the cross-sectional view 300, the plurality of p-n junction diodes 125 are disposed along the main propagation direction 211, i.e., the y-direction. Each of the modulation electrode 121 and the bias electrode 122 is also disposed along the main propagation direction 211. In addition, each of the plurality of p-n junction diodes 125 includes a p-type stripe 310 and a n-type stripe 320 that are aligned also along the main propagation direction 211. Specifically, the p-type stripe 310 and the n-type stripe 320 are disposed adjacent to one another, with a p-n junction 330 formed between the p-type stripe 310 and the n-type stripe 320. Although not explicitly shown in FIG. 3, the modulation electrode 121 is electrically coupled to the n-type stripe 320 of each of the plurality of p-n junction diodes 125, whereas the bias electrode 122 is electrically coupled to the p-type stripe 310 of each of the plurality of p-n junction diodes 125. Thus, each of the plurality of p-n junction diodes 125 is substantially biased by a voltage difference between the modulation electrode 121 and the bias electrode 122, namely, ($V_{SP}$–$I_{SP}$*R–$V_{BIAS}$). Typically, the plurality of p-n junction diodes 125 is biased such that the p-n junction 330 of each of the plurality of p-n junction diodes 125 is reversely biased, which means that a DC voltage level of the p-type stripe 310 is lower than that of the n-type stripe 320. That is, the voltage difference, ($V_{SP}$–$I_{SP}$*R–$V_{BIAS}$), has a positive value.

Figure 4:
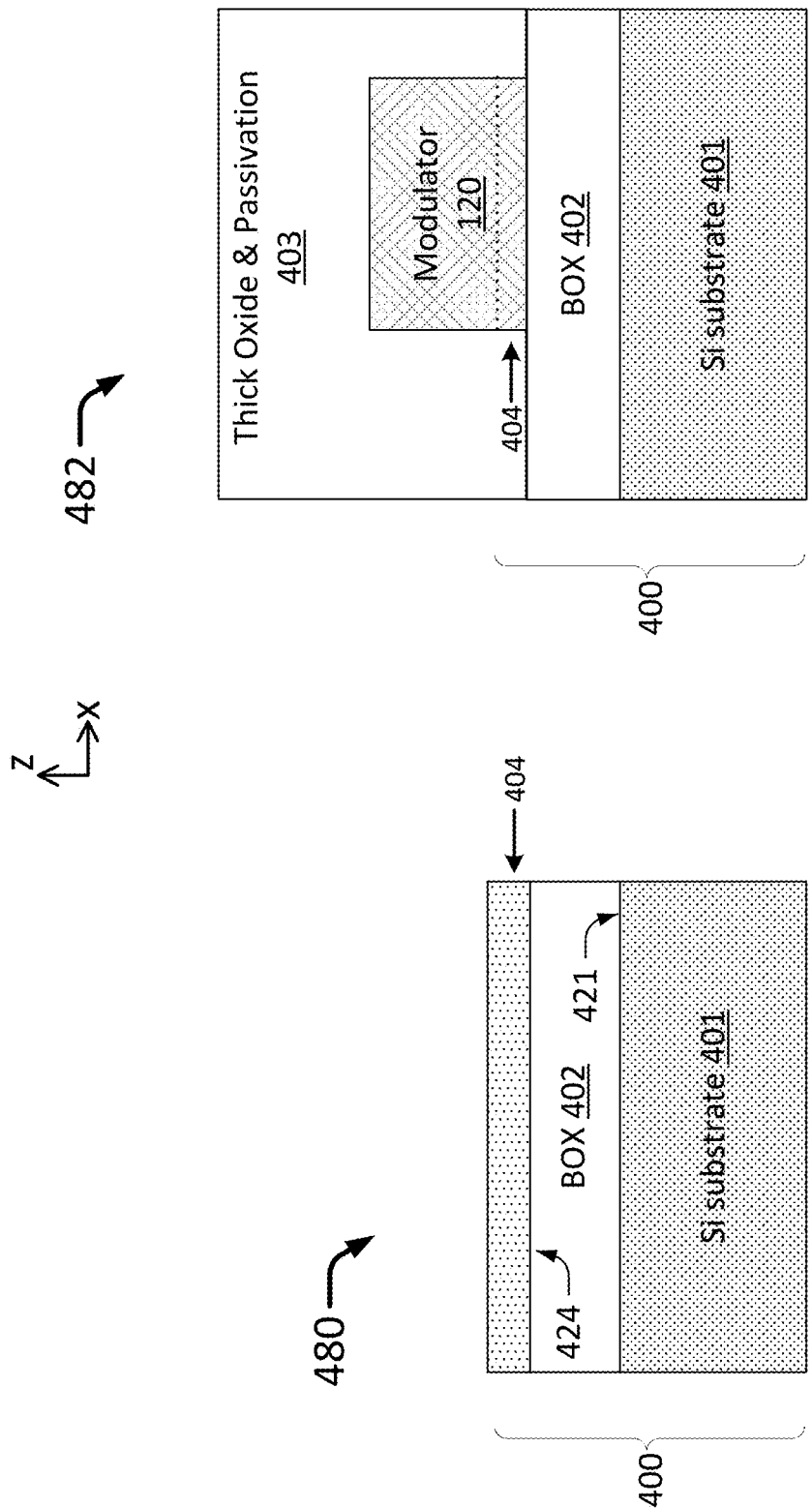
FIG. 4 illustrates a cross-sectional view of a silicon-on-insulator (SOI) substrate for fabricating a E-O modulator in accordance with an embodiment of the present disclosure.

The E-O modulator 120 may be fabricated on a silicon-on-insulator (SOI) substrate, such as a SOI substrate 400 of FIG. 4. Specifically, FIG. 4 illustrates a cross-sectional view 480 of the SOI substrate 400 before a E-O modulator, such as the modulator 120, is fabricated thereon. FIG. 4 also illustrates a cross-sectional view 482 of the SOI substrate 400 after a E-O modulator, such as the modulator 120, is fabricated thereon. The cross-sectional views 480 and 482 as shown are parallel to the x-z plane of FIG. 2. Typically, the SOI substrate 400 comprises three different layers of material, with a buried oxide (BOX) layer 402 sandwiched between a bulk silicon substrate 401 and a top silicon layer 404. Namely, the top silicon layer 404 and the bulk silicon substrate 401 are disposed respectively on two opposite sides of the BOX layer 402. The BOX layer 402 has two opposing surfaces: an upper surface 424 and a lower surface 421. The top silicon layer 404 meets the BOX layer 402 at the upper surface 424, whereas the bulk silicon substrate 401 meets the BOX layer 402 at the lower surface 421. As described above, the top silicon layer 404 typically has a thickness in the z-direction that is significantly smaller than that of the bulk silicon substrate 401. Moreover, the active region 124 of the modulator 120, particularly the plurality of p-n junction diodes 125, is fabricated in the top silicon layer 404. Also, as shown in the cross-sectional view 482, after the modulator 120 is fabricated, a thick oxide/passivation layer 403 is deposited over the SOI substrate to protect the modulator 120.

Figure 5:
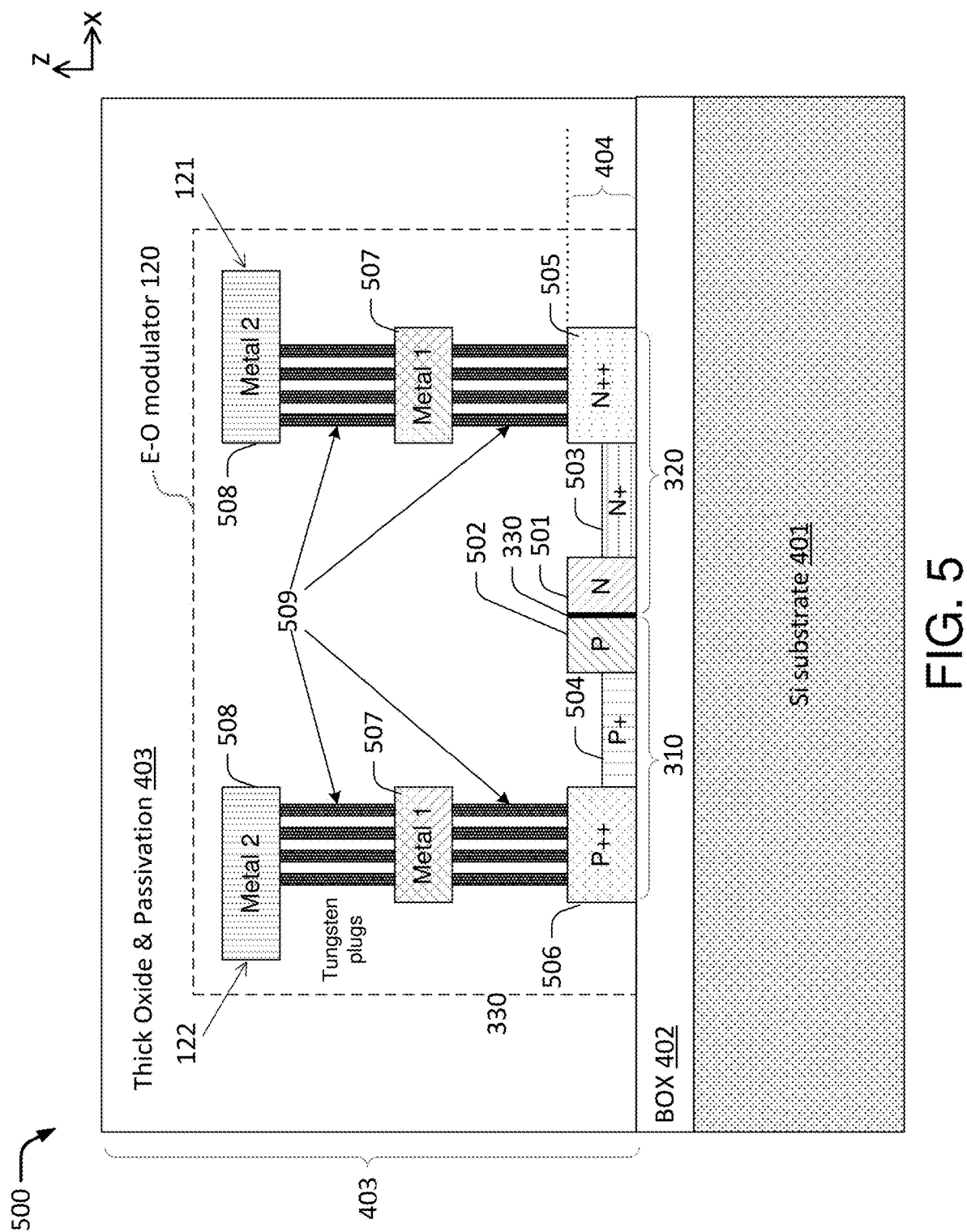
FIG. 5 illustrates a cross-sectional view of the E-O modulator in accordance with the first embodiment of the present disclosure.

FIG. 5 illustrates a cross-sectional view 500, which is a more detailed version of the cross-sectional view 482. The cross-sectional view 500 shows a cross section of the modulator 120 fabricated on the SOI substrate 400, along a line A-A of FIG. 3, which intersects with one of the plurality of p-n junction diodes 125. Specifically, various dopant regions, silicide, and metallization that make up the modulator 120 are shown in the cross-sectional view 500, including a N doped silicon region 501, a P doped silicon region 502, a N+ doped silicon region 503, a P+ doped silicon region 504, a N++ doped silicon region 505, a P++ doped silicon region 506, a metal-one layer 507, and a metal-two layer 508. In addition, tungsten plugs 509 that provide inter-layer electrical connections are shown. As shown in the cross-sectional view 500, the tungsten plugs 509 are used to electrically couple the metal-one layer 507 to the metal-two layer 508. In addition, the tungsten plugs 509 are also used to electrically couple the metal-one layer 507 to each of the N++ doped silicon region 505 and the P++ doped silicon region 506. The metal-two layer 508 is used to form the modulation electrode 121 and the bias electrode 122.

Each of the N doped silicon region 501, the P doped silicon region 502, the N+ doped silicon region 503, the P+ doped silicon region 504, the N++ doped silicon region 505, and the P++ doped silicon region 506 may represent a cross section of a short stripe or a longitudinal section that runs along the main propagation direction 211. The p-type stripe 310 is collectively formed by a section represented by the P doped silicon region 502, a section represented by the P+ doped silicon region 504, and a section represented by the P++ doped silicon region 506. Similarly, the n-type stripe 320 is collectively formed by a section represented by the N doped silicon region 501, a section represented by the N+ doped silicon region 503, and a section represented by the N++ doped silicon region 505. The p-n junction 330 is formed between the section represented by the P doped silicon region 502 and the section represented by the N doped silicon region 501.

As shown in FIG. 5, the N doped silicon region 501 and the P doped silicon region 502 are disposed alongside and adjacent to one another. The N+ doped silicon region 503 is disposed alongside and adjacent to the N doped silicon region 501, opposing the P doped silicon region 502. Similarly, the P+ doped silicon region 504 is disposed alongside and adjacent to the P doped silicon region 502, opposing the N doped silicon region 501. In addition, the N++ doped silicon region 505 is disposed alongside and adjacent to the N+ doped silicon region 503, opposing the N doped silicon region 501. Similarly, the P++ doped silicon region 506 is disposed alongside and adjacent to the P+ doped silicon region 504, opposing the P doped silicon region 502. The doped regions 501-506 are on a same side of the BOX layer 402, as they are formed in the top silicon layer 404, which is adjacent to BOX layer 402.

Each of the doped regions 501-506 may be formed by providing a specific level of N type or P type dopants in a specific region of the top silicon layer 404. Moreover, each layer or doped region in FIG. 5 may have a preferred range of thickness in the z-direction. In some embodiments, each of the N doped silicon region 501 and the P doped silicon region 502 may have a thickness in a range of 100-500 nanometers (nm), as well as a doping concentration in a range of 1e17-1e18 per cubic centimeter ($cm^{-3}$). In some embodiments, each of the N+ doped silicon region 503 and the P+ doped silicon region 504 may have a thickness in a range of 70-320 nm, as well as a doping concentration in a range of 1e18-5e18 $cm^{-3}$. In some embodiments, each of the N++ doped silicon region 505 and the P++ doped silicon region 506 may have a thickness in a range of 150-400 nm, as well as a doping concentration in a range of 1e19-1e22 $cm^{-3}$. Each of the metal-one layer 507 and the metal-two layer 508 may be made of electrically conductive metal, alloy or other material, such as aluminum-copper (Al—Cu) alloy. In some embodiments, the metal-one layer 507 may have a thickness in a range of 0.3-0.8 micrometers (um), whereas the metal-two layer 508 may have a thickness in a range of 1.5-3 um. In some embodiments, the BOX layer 402 may have a thickness in a range of 2-4 um.

Figure 6:
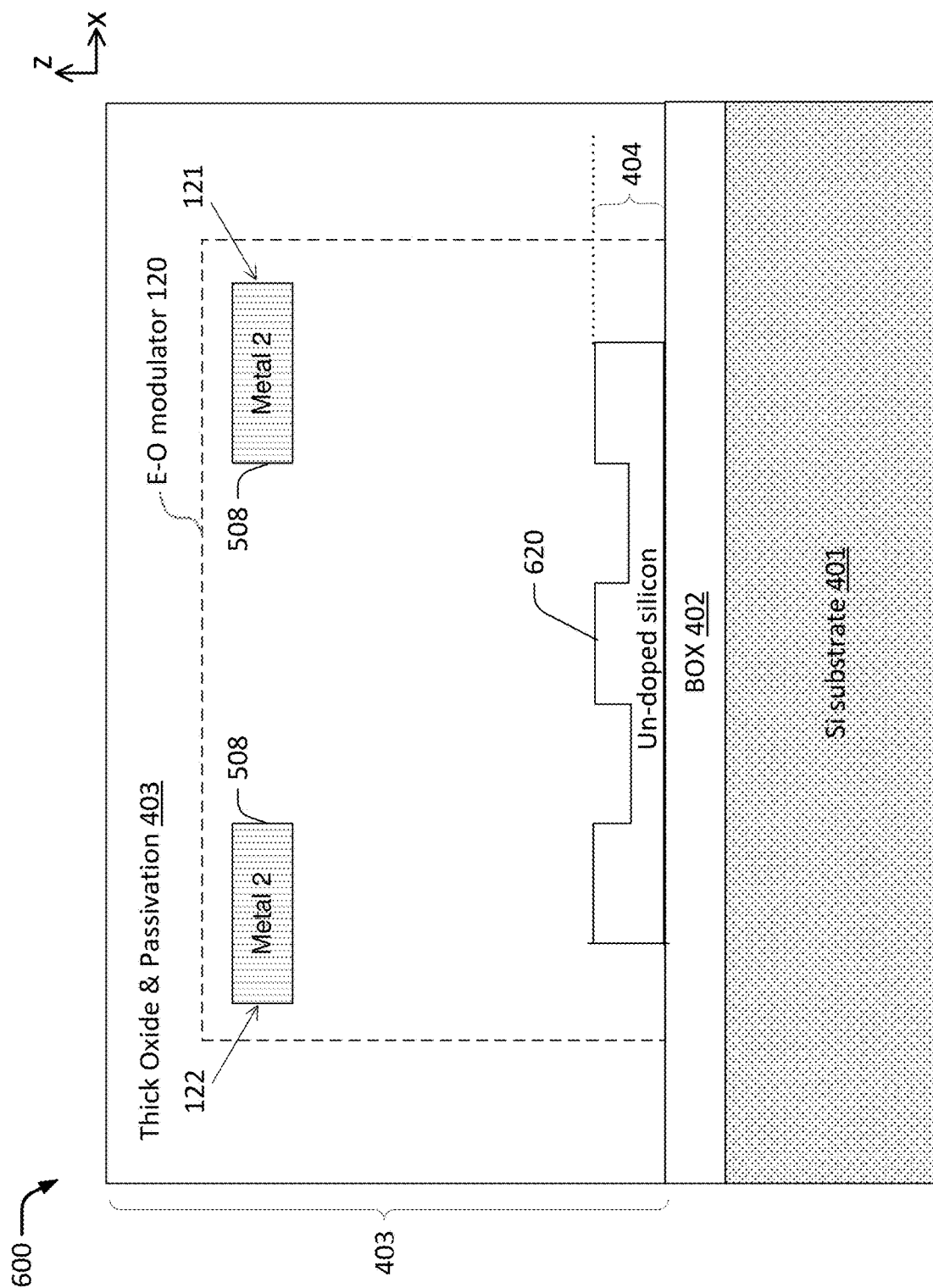
FIG. 6 illustrates another cross-sectional view of the E-O modulator in accordance with the first embodiment of the present disclosure.

FIG. 6 illustrates a cross-sectional view 600 of the modulator 120 along the line B-B of FIG. 3. Since the line B-B does not intersect with any of the plurality of p-n junction diodes 125, the top silicon layer 404 in the cross-sectional view 600 is not doped with any P type or N type dopants at any concentration. However, the top silicon layer 404, being un-doped, is formed into a region 620 that has a cross-sectional profile identical to a cross-sectional profile of a congregated area consist of a concatenation of the N doped silicon region 501, the P doped silicon region 502, the N+ doped silicon region 503, the P+ doped silicon region 504, the N++ doped silicon region 505, and the P++ doped silicon region 506 of the cross-sectional view 500. Along the main propagation direction 211 (i.e., the y-direction), the un-doped region 620 of the cross-sectional view 600 is physically continuously formed with the doped silicon region of the cross-sectional view 500 (i.e., comprising the regions 501-506) to provide an optical waveguide for guiding the optical wave in the modulator 120. Specifically, the optical waveguide as shown in FIG. 5 and FIG. 6 is a ridge waveguide, with a ridge of the ridge waveguide comprising the N doped silicon region 501 and the P doped silicon region 502. In some embodiments, a height of the ridge waveguide (i.e., a dimension of the N doped silicon region 501 and the P doped silicon region 502 in the z-direction) is in a range of 100-500 nm, whereas a width of the ridge (i.e., a dimension of the N doped silicon region 501 and the P doped silicon region 502 combined in the x-direction) is in a range of 300-700 nm.

Figure 7:
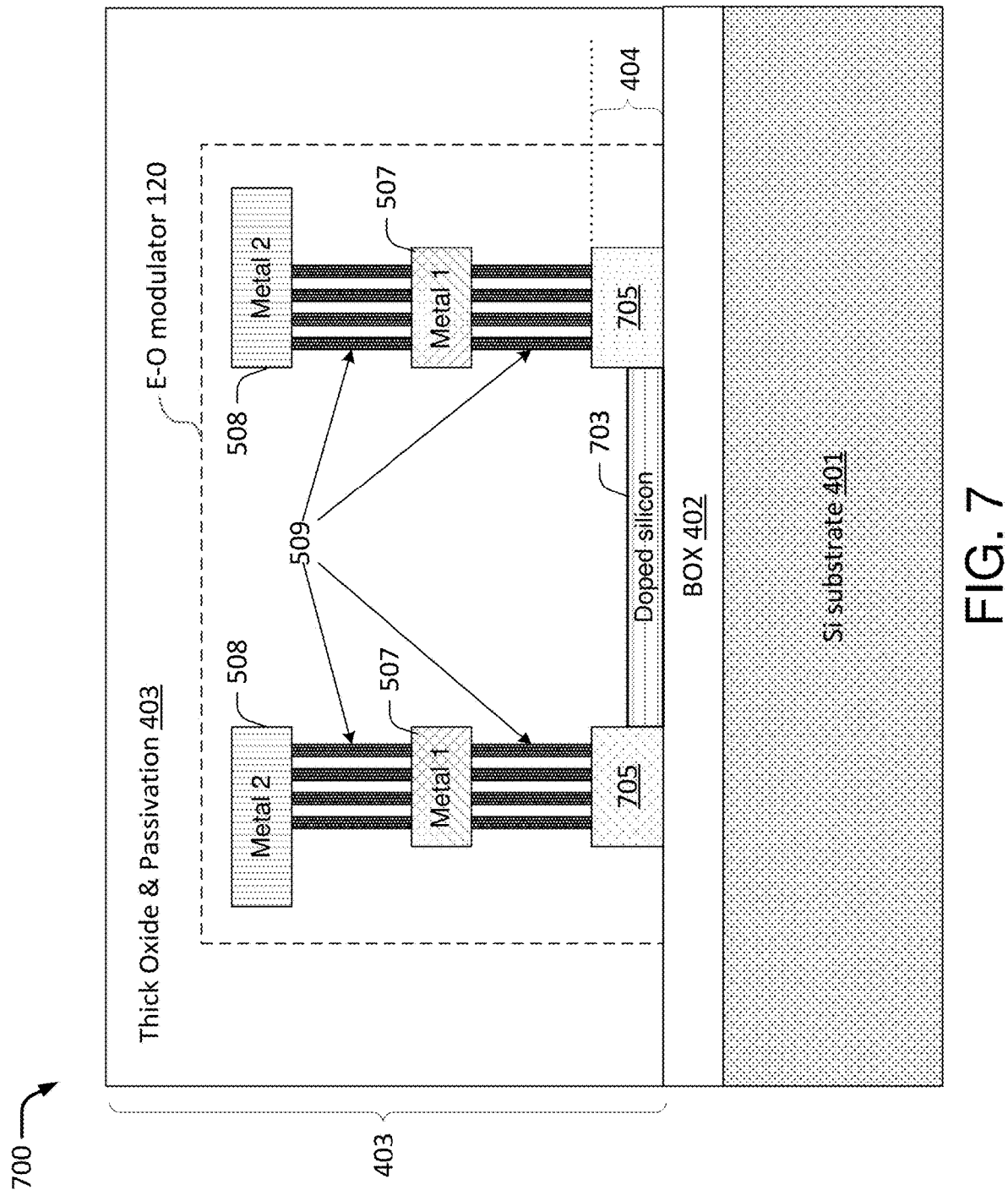
FIG. 7 illustrates an embodiment of a miniaturized resistor fabricated on a SOI substrate in accordance with an embodiment of the present disclosure.

FIG. 7 illustrates a cross-sectional view 700 of a miniaturized resistor, which may be an embodiment of the resistor 126 of the modulator 120. The miniaturized resistor may include a doped silicon region 703 formed in the top silicon layer 404 of the SOI substrate 400. The doped silicon region 703 is doped with N type or P type dopants at a proper doping concentration to provide a resistivity desired. The miniaturized resistor may also include two highly doped silicon regions 705, which form the two ohmic contacts of the miniaturized resistor. Via the ohmic contacts and a combination of metalization comprising the tungsten plugs 509, the metal-one layer 507, and the metal-two layer 508, the miniaturized resistor may be electrically coupled to other parts of the modulator 120, such as the second end of the modulation electrode 121 and the power supply interface 143.

Figure 8:
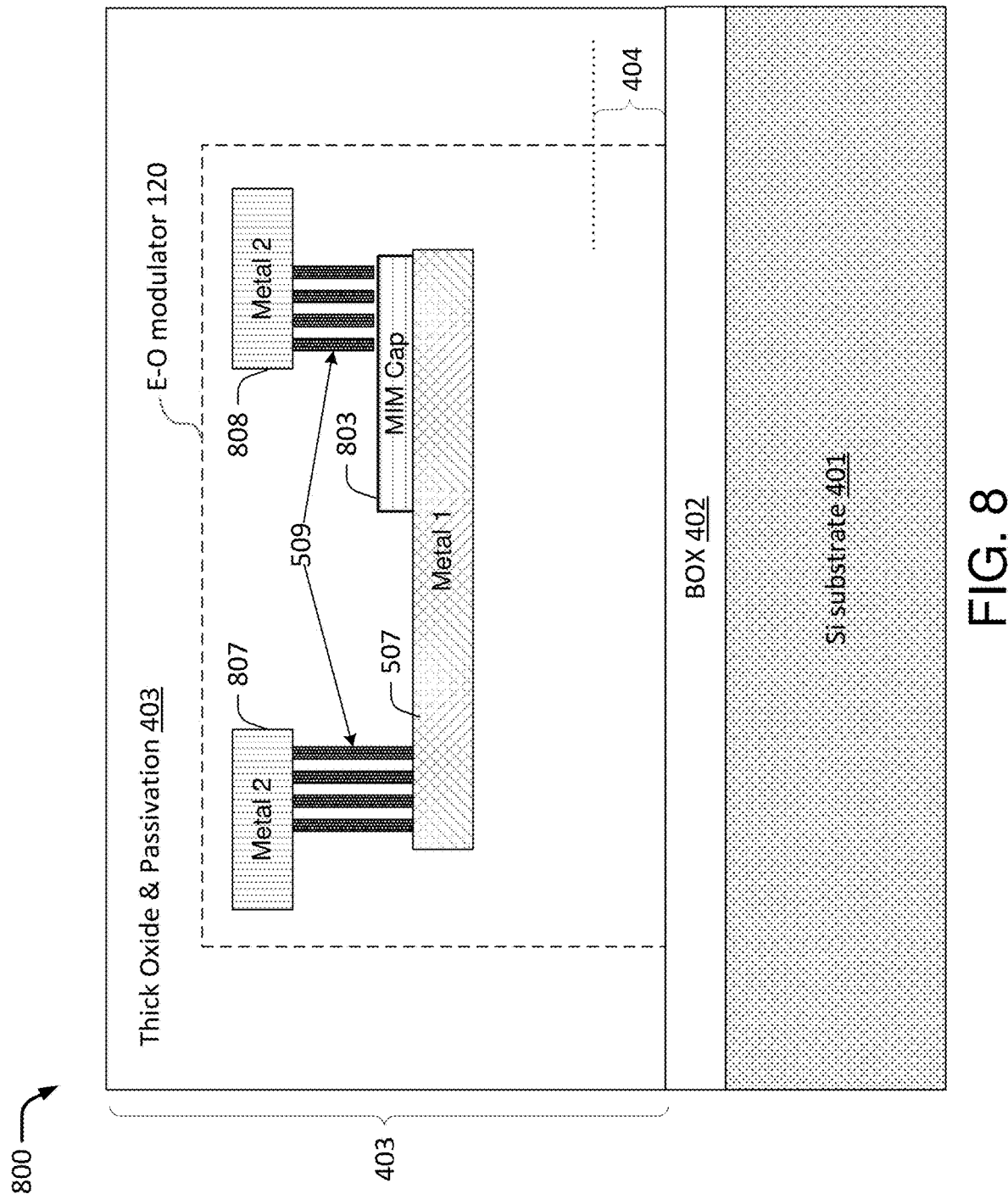
FIG. 8 illustrates an embodiment of a miniaturized capacitor fabricated on a SOI substrate in accordance with an embodiment of the present disclosure.

FIG. 8 illustrates a cross-sectional view 800 of a miniaturized capacitor, which may be an embodiment of the capacitor 127 or the capacitor 128 of the modulator 120. The miniaturized capacitor may include a metal-insulator-metal (MIM) region 803. In some embodiments, the MIM region 803 may be realized by a dielectric layer disposed between the metal-one layer 507 and the metal-two layer 508, as shown in the cross-sectional view 800. The two metal-two metal pieces, 807 and 808, may be electrically coupled to the MIM region 803 and serve as the two terminals of the miniaturized capacitor. In some embodiments, the MIM region 803 may be realized between two patterned pieces of metal in either the metal-one layer 507 or the metal-two layer 508. The two patterned pieces of metal may be placed close to one another with a calculated spacing in between so as to generate a desired capacitance between the two patterned pieces of metal. Via the two patterned pieces of metal or the two metal-two metal pieces 807 and 808, the miniaturized capacitor may be electrically coupled to other parts of the modulator 120, such as the first or second end of the bias electrode 122, the electrical ground 123, and/or the power supply interface 143.

Second Embodiment

Figure 9:
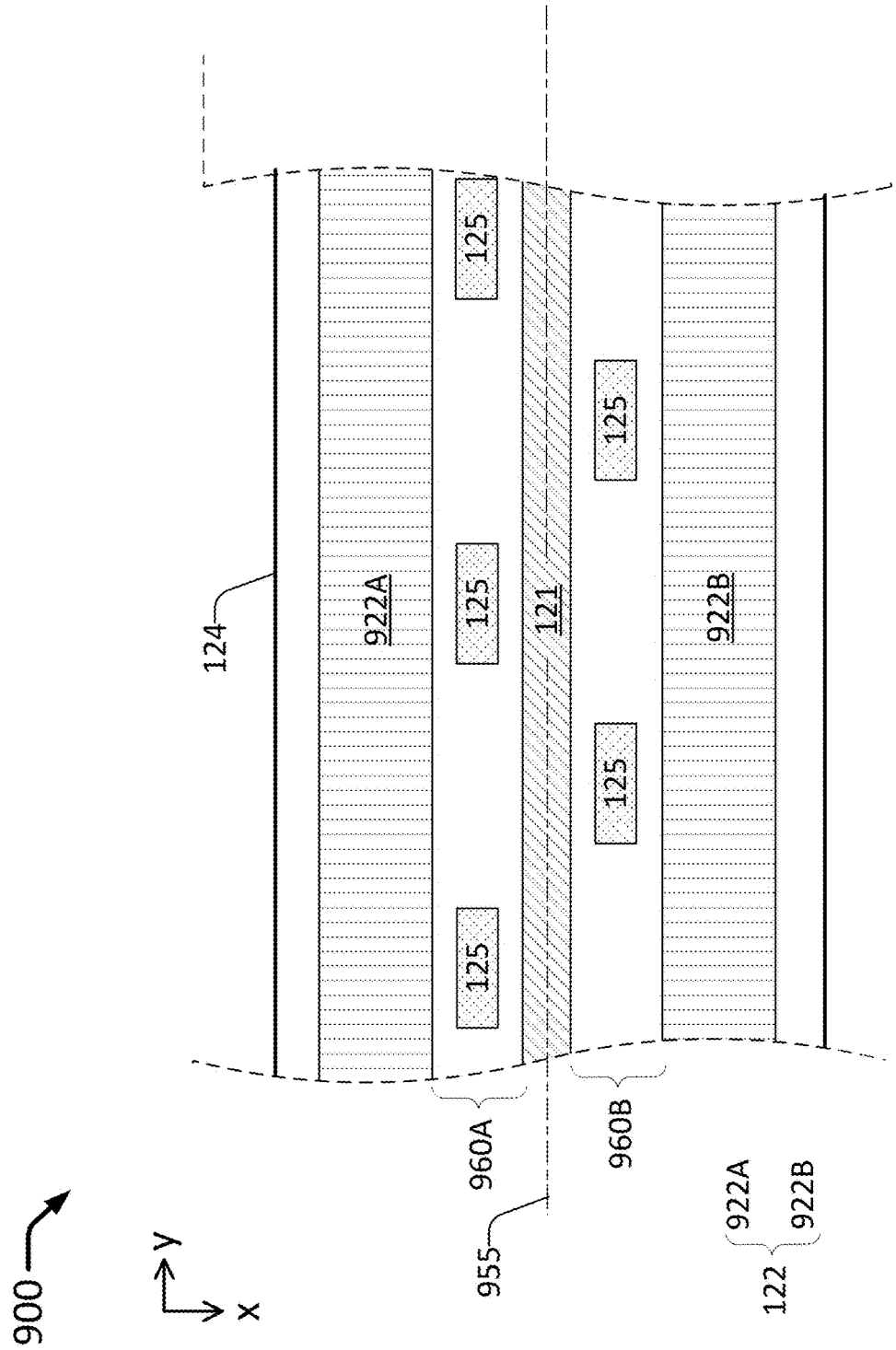
FIG. 9 illustrates a cross-sectional view of an active region of an E-O modulator in accordance with a second embodiment of the present disclosure.

FIG. 9 reveals a second embodiment of the active region 124. Specifically, FIG. 9 illustrates a cross-sectional view 900 of the active region 124 along the main propagation direction 211. Same as the cross-sectional view 300, the cross-sectional view 900 reveals a cross section that is parallel to the x-y plane of FIG. 2. Some of the plurality of p-n junction diodes 125 are shown, along with a portion of the modulation electrode 121 and a portion of the bias electrode 122. A primary difference of the cross-sectional view 900, as compared to the cross-sectional view 300, is that the bias electrode 122 includes not just one, but two electrically conductive stripes, 922A and 922B. That is, the bias electrode 122 of FIG. 1 is embodied by the two stripes 922A and 922B of FIG. 9. The two stripes 922A and 922B are substantially matched, i.e., substantially identical to one another in length and material compositions. Moreover, each of the stripes 922A and 922B is disposed on a respective side of the modulation electrode 121. Thus, both of the stripes 922A and 922B, along with the modulation electrode 121, are disposed along the main propagation direction 211. Also, each of the stripes 922A and 922B may extend for the whole length L of the active region 124, from the front surface 201 to the rear surface 202.

In some embodiments, the stripes 922A and 922B are disposed at an equal distance from the modulation electrode 121. That is, the stripes 922A and 922B may be symmetrical with respect to a center line 955 of the modulation electrode 121. The two stripes 922A and 922B and the modulation electrode 121 essentially form a coplanar waveguide (CPW) electrode for carrying or otherwise conducting the electrical modulation signal generated by the electrical driver circuit 110 along the whole length L of the active region 124.

For the second embodiment of the active region 124 revealed in FIG. 9, two channels are formed between the modulation electrode 121 and the bias electrode 122, wherein the plurality of p-n junction diodes 125 may be distributed. As shown in FIG. 9, a first channel, channel 960A, is formed between the stripe 922A and the modulation electrode 121, whereas a second channel, channel 960B, is formed between the stripe 922B and the modulation electrode 121. Both the channels 960A and 960B may be used to accommodate some of the plurality of the p-n junction diodes 125. For example, half of the plurality of the p-n junction diodes 125 may be distributed, along the main propagation direction (i.e., the y-direction in FIG. 9), in each of the channels 960A and 960B. Moreover, as shown in FIG. 9, the plurality of the p-n junction diodes 125 may be arranged alternatively between the channels 960A and 960B as the modulation electrode runs down the y-direction (i.e., the main propagation direction 211). In some embodiments, the plurality of the p-n junction diodes 125 may be distributed only in one of the two channels 960A and 960B.

For the second embodiment of the active region 124 revealed in FIG. 9, electrical connections remain unchanged from the connections presented in FIG. 1. That is, the DC bias voltage $V_{BIAS}$ is electrically coupled to both of the conductive stripes 922A and 922B by the DC bias interface 142. The capacitor 127 may have half of its capacitance coupled between the electrical ground 123 and a first end of the stripe 922A. Meanwhile, the capacitor 127 may have the other half of its capacitance coupled between the electrical ground 123 and a first end of the stripe 922B. Both the first end of the stripe 922A and the first end of the stripe 922B are located at a same end of the active region 124, say, at the front surface 201. Similarly, the capacitor 128 may have half of its capacitance coupled between the power supply interface 143 and a second end of the stripe 922A. Additionally, the capacitor 128 may have the other half of its capacitance coupled between the power supply interface 143 and a second end of the stripe 922B. Both the second end of the stripe 922A and the second end of the stripe 922B are located at a same end of the active region 124, say, at the rear surface 202.

Third Embodiment

Figure 10:
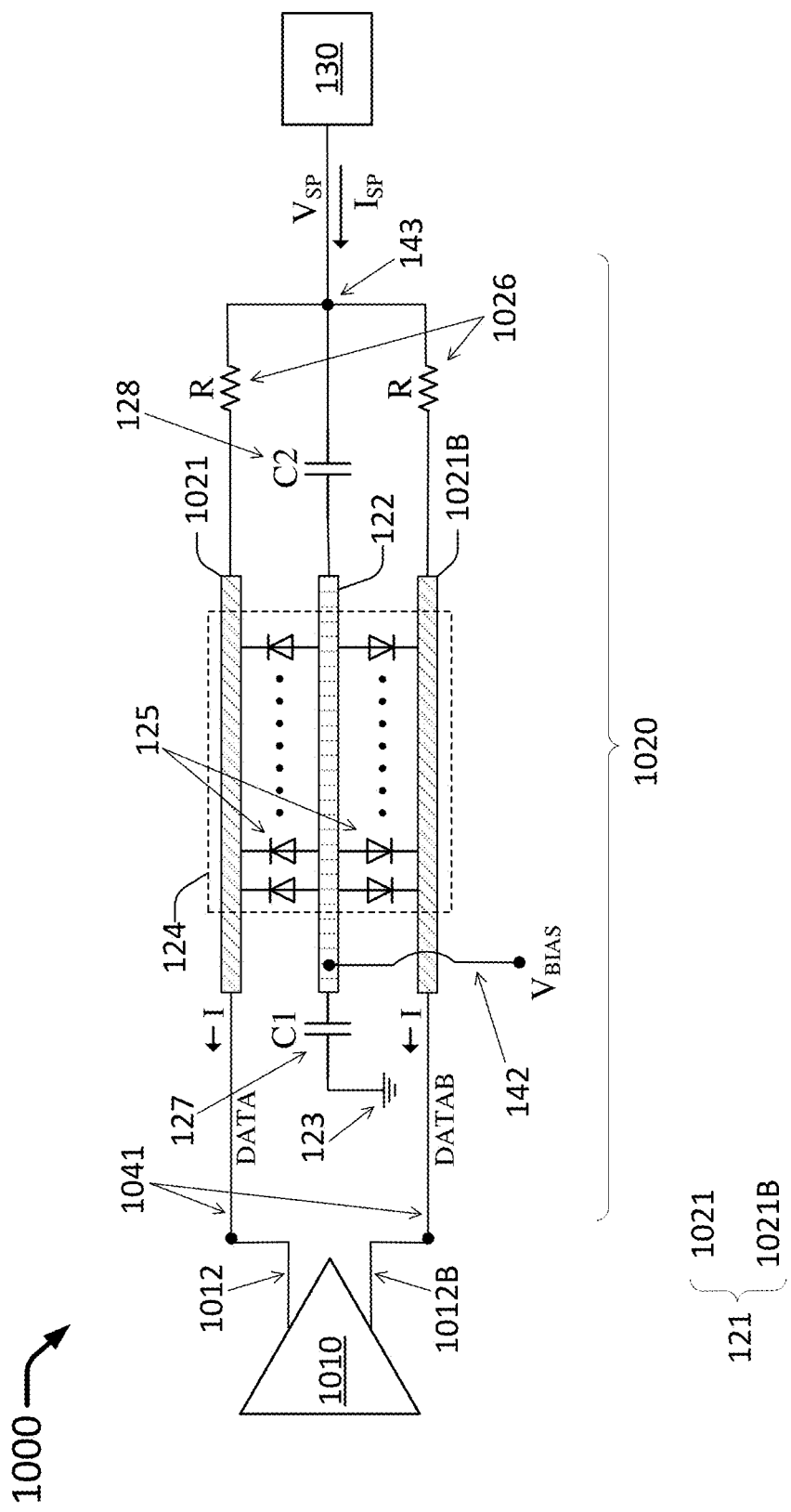
FIG. 10 illustrates a schematic diagram of a modulation system having the E-O modulator in accordance with a third embodiment of the present disclosure.

In some embodiments, a E-O modulator may be driven by a pair of differential signals generated by an electrical driver circuit. FIG. 10 illustrates a schematic diagram of a modulation system 1000 employing such an electrical driver circuit. The modulation system 1000 includes an electrical driver circuit 1010, an E-O modulator 1020, and the power supply 130. Instead of generating a single-ended modulation signal like the electrical driver circuit 110 of the modulation system 100 does, the electrical driver circuit 1010 of the modulation system 1000 generates a pair of differential modulation signals that is presented at a pair of output nodes 1012 and 1012B of the electrical driver circuit 1010. Moreover, the RCBC electrode of the modulator 1020 includes a pair of resistors 1026, the first capacitor 127, the bias electrode 122, and the second capacitor 128.

Similar to the single-ended modulation signal generated by the electrical driver circuit 110, each of the pair of differential modulation signals presented at the output nodes 1012 and 1012B also includes a DC component and a RF component. The pair of differential modulation signals is differential in a sense that the RF component of the modulation signal presented at the node 1012 and the RF component of the modulation signal presented at the node 1012B have a same magnitude but are substantially 180 degrees out of phase from one another, even though they share a same DC component. The pair of differential modulation signals are denoted as DATA and DATAB, respectively, in FIG. 10.

Essentially, the E-O modulator 1020 may be viewed as identical to the E-O modulator 120 of modulation system 100, except that the modulation electrode 121 now embodied by two electrically conductive stripes 1021 and 1021B, driven by the pair of differential modulation signals DATA and DATAB. The two stripes 1021 and 1021B are substantially matched, i.e., substantially identical to one another in all physical dimensions and material compositions. Each of the pair of resistors 1026 is coupled between the power supply interface 143 and a respective one of the stripes 1021 and 1021B. Since the two stripes 1021 and 1021B are substantially matched, each of the two stripes 1021 and 1021B may conduct a current I of half of the current Isp. That is, a DC current I would flow from the power supply 130 and across one of the pair of resistors 1026 and the stripe 1021, and then enter the output node 1012 of the electrical driver circuit 1010. Meanwhile, another DC current I would flow from the power supply 130 and across the other one of the pair of resistors 1026 and the stripe 1021B, and then enter the output node 1012B of the electrical driver circuit 1010. Physically, each of the stripes 1021 and 1021B may extend through the active region 124 from the front surface 201 to the rear surface 202.

In addition, modulator 1020 has a RF input interface 1041 that is slightly different from the RF input interface 141 of modulator 120. Specifically, the RF input interface 1041 includes a pair of electrical conductors configured to receive the pair of differential electrical modulation signal generated by the electrical driver circuit 1010 and presented at the output nodes 1012 and 1012B. Similar to the RF input interface 141, the RF input interface 1041 is electrically coupled to the modulation electrode 121. Specifically, each of the pair of electrical conductors of the RF input interface 1041 is electrically coupled to a respective one of the stripes 1021 and 1021B of the modulation electrode 121 of the modulator 1020. In some embodiments, the RF input interface 1041 may be an extension of the modulation electrode 121, and the pair of differential modulation signals may be directly coupled to each of the stripes 1021 and 1021B of the modulation electrode 121 from the output nodes 1012 and 1012B of the electrical driver circuit 1010.

Figure 11:
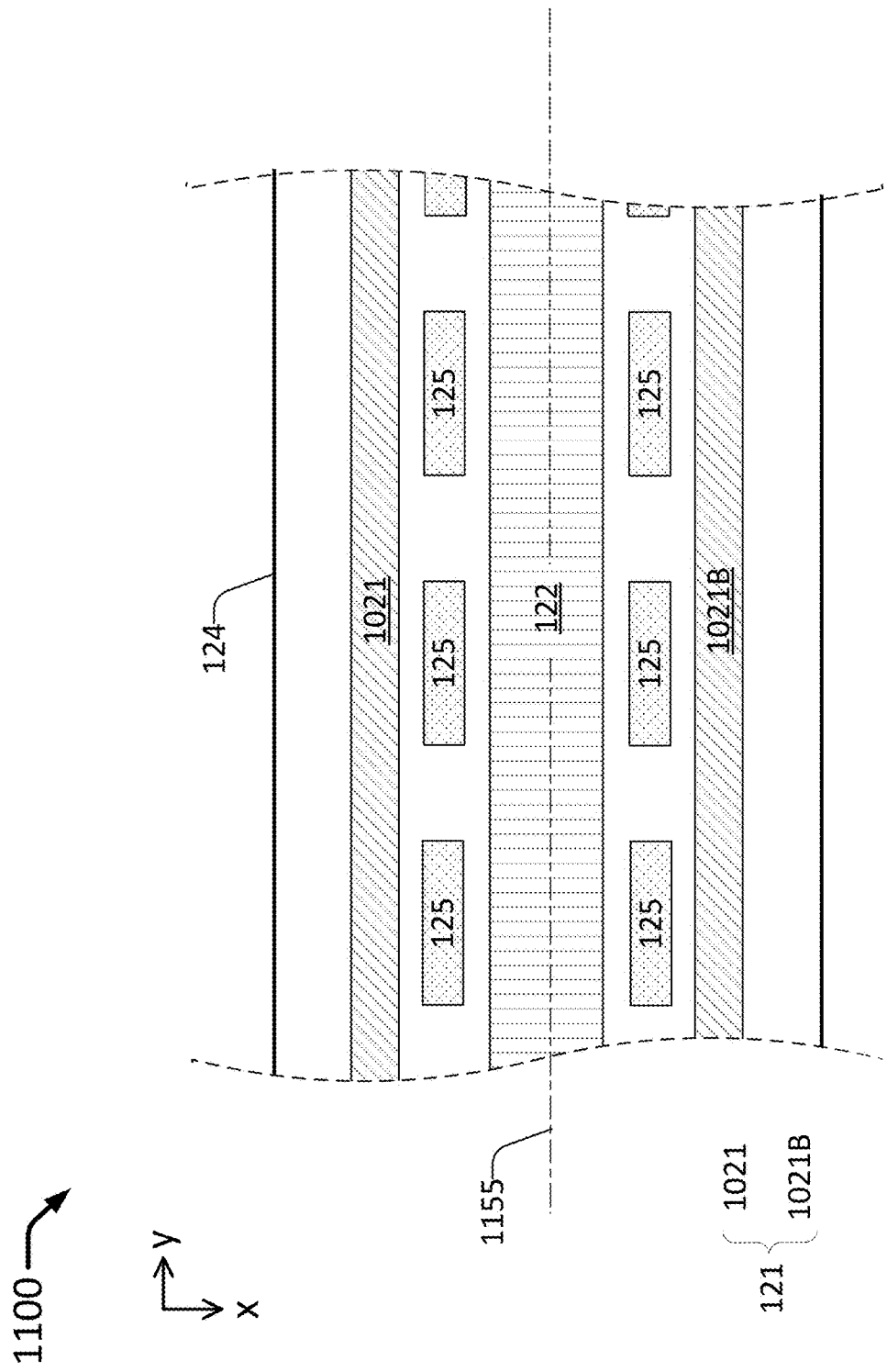
FIG. 11 illustrates a cross-sectional view of an active region of an E-O modulator in accordance with the third embodiment of the present disclosure.

FIG. 11 reveals a third embodiment of the active region 124, particularly for implementing the active region 124 of the modulator 1020. Specifically, FIG. 11 illustrates a cross-sectional view 1100 of the active region 124 along the main propagation direction 211. Same as the cross-sectional view 300, the cross-sectional view 1100 reveals a cross section that is parallel to the x-y plane of FIG. 2. Some of the plurality of p-n junction diodes 125 are shown, along with a portion of the modulation electrode 121 and a portion of the bias electrode 122. A primary difference of the cross-sectional view 1100, as compared to the cross-sectional view 300, is that the modulation electrode 121 includes not just one, but two electrically conductive stripes, namely, the stripes 1021 and 1021B. That is, the modulation electrode 121 of FIG. 1 is embodied by the two stripes 1021 and 1021B of FIG. 11. Similar to the two stripes 922A and 922B of the bias electrode 122, two stripes 1021 and 1021B as shown in FIG. 11 are substantially matched. Moreover, each of the stripes 1021 and 1021B is disposed on a respective side of the bias electrode 122. Thus, both of the stripes 1021 and 1021B, along with the bias electrode 122, are disposed along the main propagation direction 211. Also, each of the stripes 1021 and 1021B may extend for the whole length L of the active region 124, from the front surface 201 to the rear surface 202.

In some embodiments, the stripes 1021 and 1021B are disposed at an equal distance from the bias electrode 122. The equal distance between the bias electrode 122 and each of the stripes 1021 and 1021B is essential to maintaining the modulation electrode 121 a well balanced load to the electrical driver circuit 1010 in the differential scheme of the modulation system 1000. Furthermore, the plurality of the p-n junction diodes 125 may be distributed in the active region 124 in a way that the distribution of the plurality of the p-n junction diodes 125 is symmetrical with respect to a center line 1155 of the bias electrode 122.

Fourth Embodiment

Figure 12A:
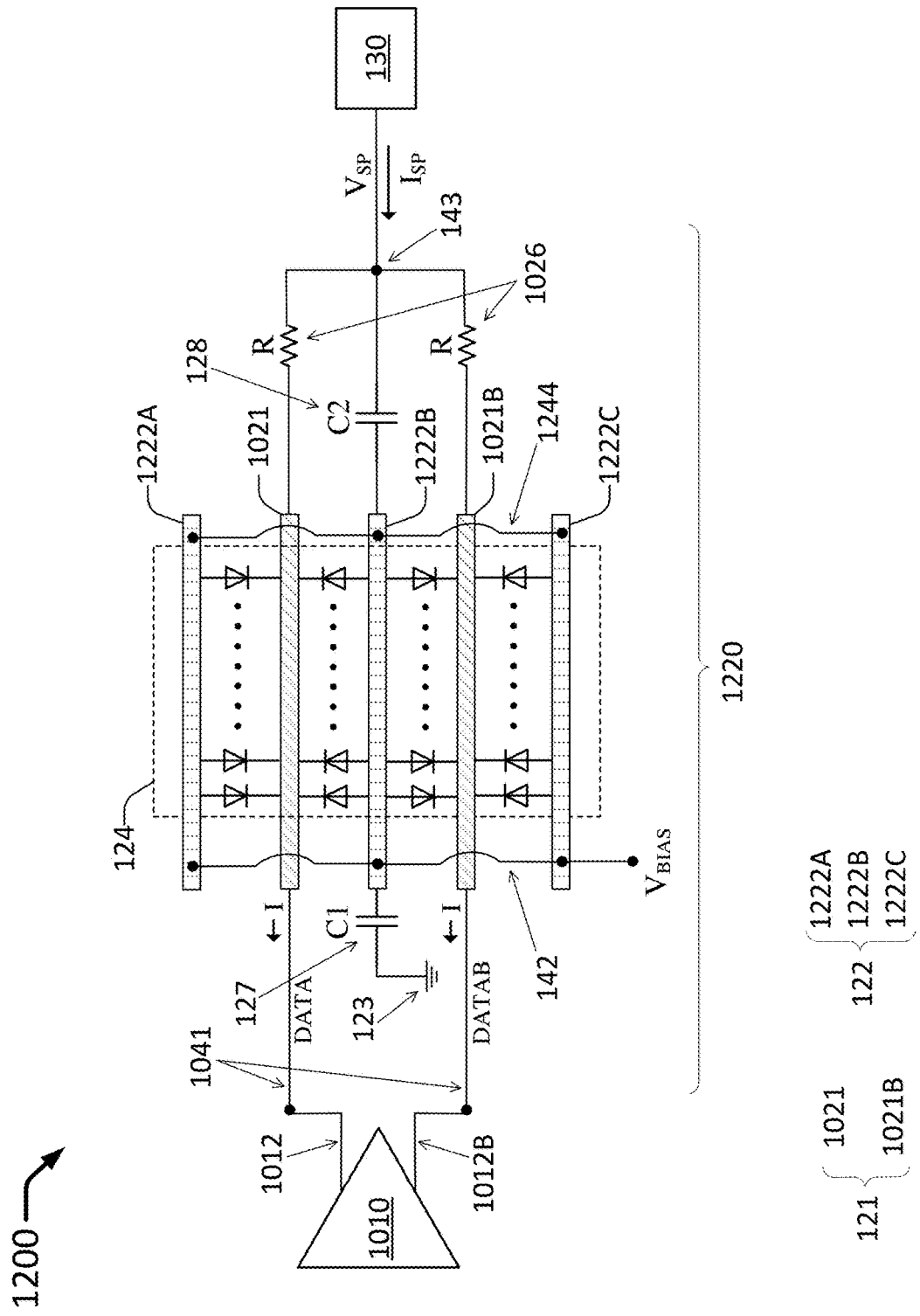
FIG. 12A and FIG. 12B each illustrates a schematic diagram of a modulation system having an E-O modulator in accordance with a fourth embodiment of the present disclosure.

FIG. 12A illustrates a schematic diagram of a modulation system 1200. The modulation system 1200 includes the electrical driver circuit 1010, an E-O modulator 1220, and the power supply 130. The modulation system 1200 may be viewed as a variation based on the modulation system 1000, wherein a primary difference between the modulation systems 1000 and 1200 resides in the later using a CPW electrode for each of the pair of differential modulation signals, DATA and DATAB, generated by the electrical driver circuit 1010. Specifically, the bias electrode 122 of the modulator 1220 includes three electrically conductive stripes: 1222A, 1222B and 1222C that are substantially matched, i.e., substantially identical to each other in physical dimensions and material compositions.

The strips 1222A, 1222B and 1222C are electrically coupled to the DC bias voltage, $V_{BIAS}$, via the DC bias interface 142. The stripes 1222A and 1222B of the bias electrode 122, together with the stripe 1021 of the modulation electrode 121, form a CPW electrode for conducting one of the pair of differential modulation signals generated by the electrical driver circuit 1010, i.e., the signal denoted by DATA in FIG. 12A. Likewise, the stripes 1222B and 1222C of the bias electrode 122, together with the stripe 1021B of the modulation electrode 121, form a CPW electrode for conducting the other one of the pair of differential modulation signals generated by the electrical driver circuit 1010, i.e., the signal denoted by DATAB in FIG. 12A.

Physically, the stripes 1222A, 1222B and 1222C are disposed in parallel with each other and extend through the active region 124 of the modulator 1220. Same as the stripes 1021 and 1021B of the modulation electrode 121, the stripes 1222A, 1222B and 1222C of the bias electrode 122 are also disposed along the primary propagation direction 211. In particular, each of the three stripes 1222A, 1222B and 1222C has a first end at the front surface 201 and a second end the rear surface 202, and each of the three stripes 1222A, 1222B and 1222C extends from the respective first end to the respective second end through the active region 124 of the modulator 1220. In some embodiments, the three first ends of the stripes 1222A, 1222B and 1222C may be electrically coupled to each other by the DC bias interface 142, whereas the three second ends of the stripes 1222A, 1222B and 1222C may be also electrically coupled to each other by a conductor 1244.

Figure 12B:
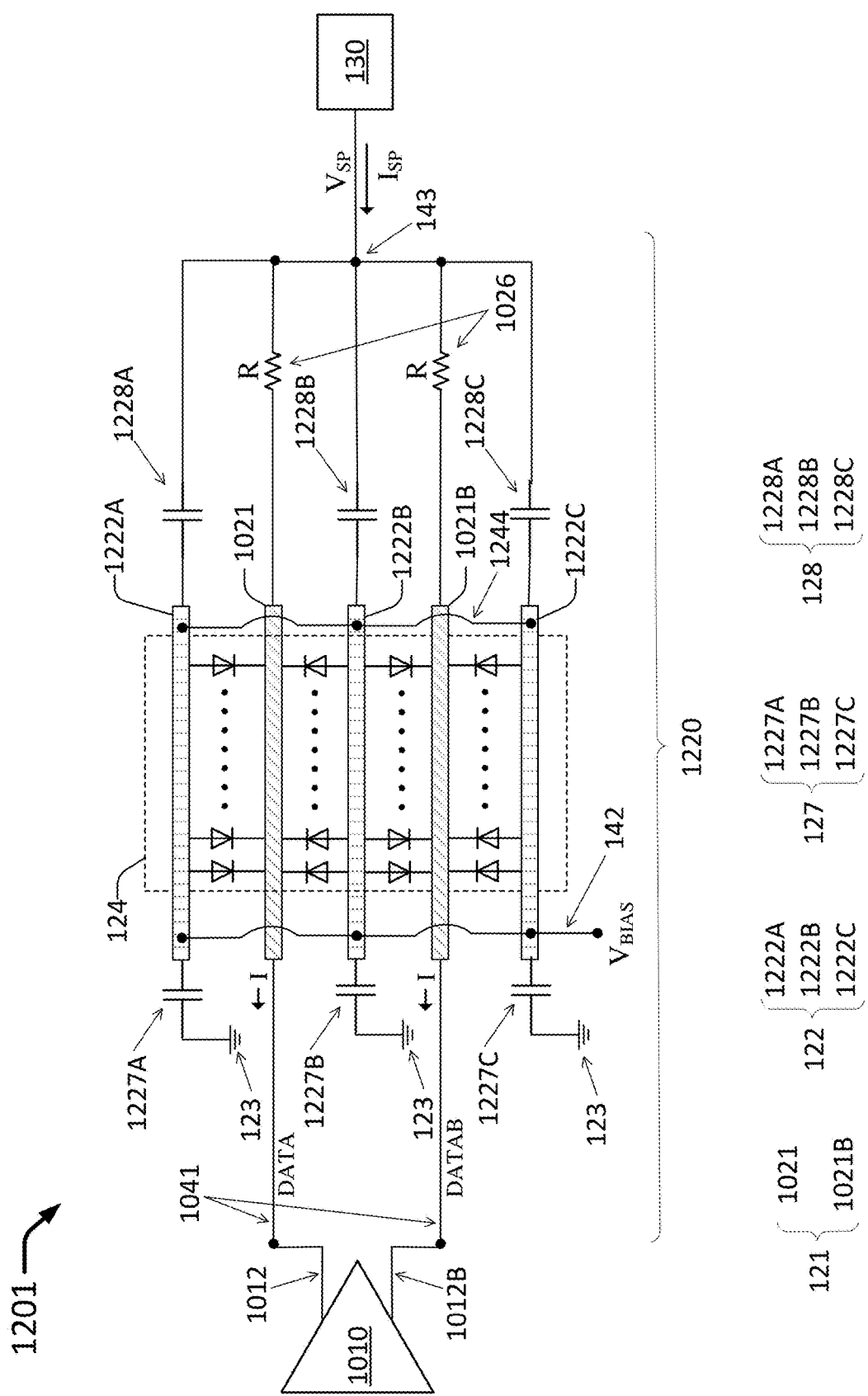

FIG. 12B illustrates a schematic diagram of a modulation system 1201, which shows a close variation of the modulation system 1200 of FIG. 12A. Particularly, the modulation system 1201 has each of the isolation capacitors 127 and 128 deployed to the three stripes of the bias electrode 122 (i.e., stripes 1222A, 1222B and 1222C) in a distributed configuration. As shown in FIG. 12B, the isolation capacitor 127 of the modulation system 1201 includes three capacitors, i.e., capacitors 1227A, 1227B and 1227C, which are respectively coupled between the electrical ground 123 and the first end of the stripes 1222A, 1222B and 1222C. Likewise, the isolation capacitor 128 of the modulation system 1201 also includes three capacitors, i.e., capacitors 1228A, 1228B and 1228C, which are respectively coupled between the power supply interface 143 and the second end of the stripes 1222A, 1222B and 1222C. Compared with the modulation system 1200 of FIG. 12A, the modulation system 1201 of FIG. 12B may be more advantageous, as the stripes 1222A and 1222C, in addition to the stripe 1222B, are also better isolated from electrical noises in the ambient environment. The distributed deployment of the isolation capacitors 127 and 128 to each of the stripes 1222A, 1222B and 1222C results in a solid DC bias network of $V_{BIAS}$ presented on the stripes 1222A, 1222B and 1222C, via which the plurality of p-n junction diodes 125 can be uniformly biased.

Figure 13:
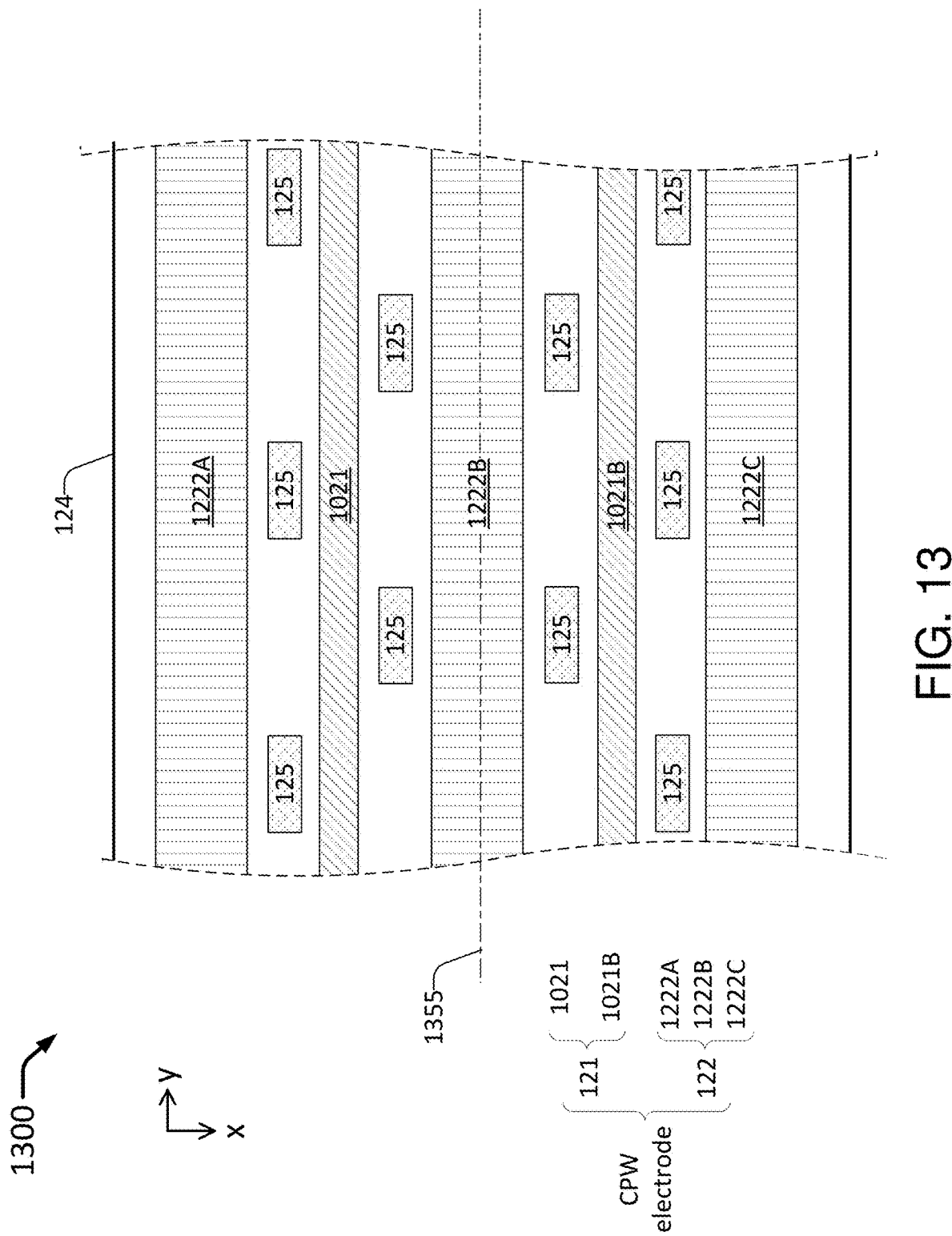
FIG. 13 illustrates a cross-sectional view of an active region of the E-O modulator in accordance with the fourth embodiment of the present disclosure.

FIG. 13 reveals a fourth embodiment of the active region 124, particularly for implementing the active region 124 of the modulator 1220. Specifically, FIG. 13 illustrates a cross-sectional view 1300 of the active region 124 along the main propagation direction 211. Same as the cross-sectional view 300, the cross-sectional view 1300 reveals a cross section that is parallel to the x-y plane of FIG. 2. Some of the plurality of p-n junction diodes 125 are shown, along with a portion of the modulation electrode 121 and a portion of the bias electrode 122. A major difference of the cross-sectional view 1300, as compared to the cross-sectional view 300, is that the modulation electrode 121 includes not just one, but two electrically conductive stripes, namely, the stripes 1021 and 1021B. Additionally, another major difference of the cross-sectional view 1300, as compared to the cross-sectional view 300, is that the bias electrode 122 includes not just one, but three electrically conductive stripes, namely, the stripes 1222A, 1222B and 1222C. Specifically, the stripes 1021, 1021B, 1222A, 1222B and 1222C are all disposed along with the main propagation direction 211.

Furthermore, the two stripes of the modulation electrode 121 (i.e., stripes 1021, 1021B) are disposed interdigitally among the three stripes of the bias electrode 122 (i.e., stripes 1222A, 1222B and 1222C). That is, each of the two stripes of the modulation electrode 121 has two neighboring stripes of the bias electrode 122, placed in parallel. As shown in the cross-sectional view 1300, each of the stripes 1222A and 1222B is disposed on a respective side of the stripe 1021. Also, each of the stripes 1222B and 1222C is disposed on a respective side of the stripe 1021B. Additionally, each of the stripes 1021 and 1021B is disposed on a respective side of the stripe 1222B. Moreover, the stripe 1021 of the modulation electrode 121 is placed in parallel with two neighboring stripes, the stripes 1222A and 1222B of the bias electrode 122. Also, the stripe 1021B of the modulation electrode 121 is placed in parallel with two neighboring stripes, the stripes 1222B and 1222C of the bias electrode 122. In some embodiments, a spacing between any pair of neighboring stripes of the stripes 1021, 1021B, 1222A, 1222B and 1222C remains constant.

Similar to the CPW electrode shown in FIG. 9 that is consist of the modulation electrode 121 and the two stripes 922A and 922B of the bias electrode 122, the stripes 1021, 1021B, 1222A, 1222B and 1222C as shown in FIG. 13 also form a CPW electrode that is balanced for conducting the pair of differential modulation signals, DATA and DATAB. In some other embodiments, other types of balanced electrodes may be adopted, such as a coplanar strip electrode.

As shown in the cross-sectional view 1300, the plurality of p-n junction diodes 125 are disposed symmetrically with respect to a center line 1355 of the stripe 1222B. In some embodiments, other arrangements of the plurality of p-n junction diodes 125 may be adopted. In some embodiments, the plurality of p-n junction diodes 125 has an arrangement that is symmetrical with respect to the CPW electrode.

Figure 14:
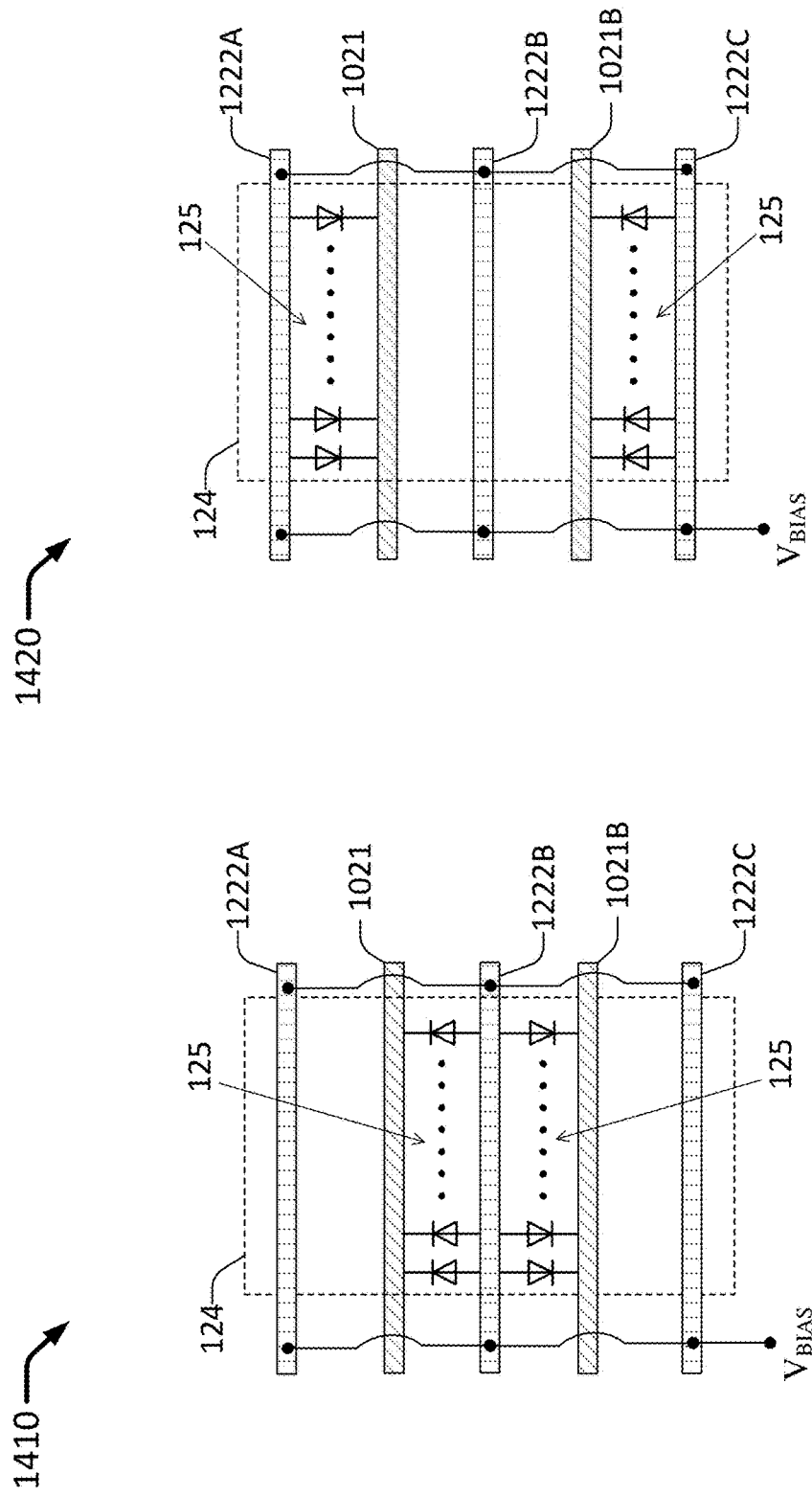
FIG. 14 illustrates two schematic diagrams each showing a respective arrangement of a plurality of p-n junction diodes for the E-O modulator in accordance with the fourth embodiment of the present disclosure.
Figure 15:
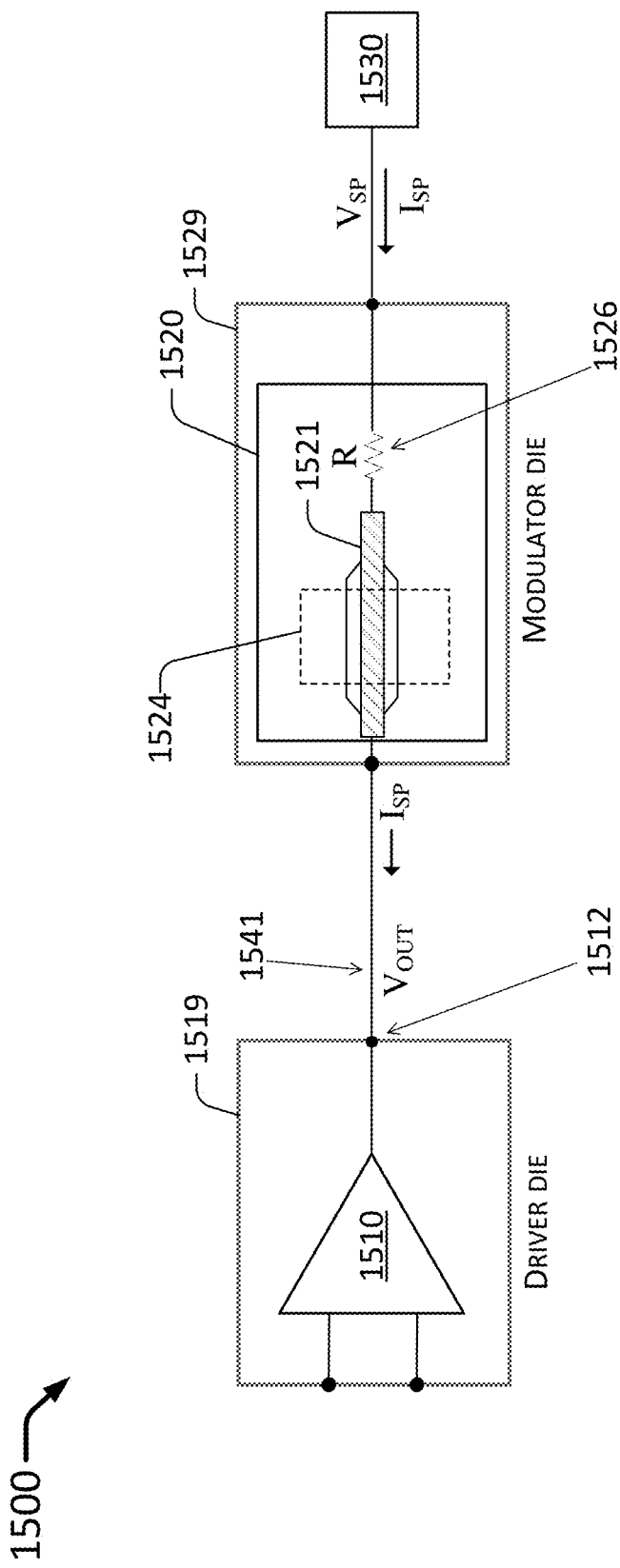
FIG. 15 illustrates a schematic diagram of an electrical driver circuit driving an E-O modulator in a conventional way.

FIG. 14 illustrates two schematic diagrams 1410 and 1420, each showing a respective arrangement of the plurality of p-n junction diodes 125. Each of the schematic diagrams 1410 and 1420 also illustrates a CPW electrode consist of the stripes 1021, 1021B, 1222A, 1222B and 1222C. Specifically, the arrangement of the plurality of p-n junction diodes 125 in each of the two schematic diagrams 1410 and 1420 is symmetrical with respect to the CPW electrode, and thus may be used to embody the active region 124 of the modulator 1220 of FIG. 12A or FIG. 12B.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A monolithic electro-optical (E-O) modulator, comprising:
    an active region configured to accommodate an optical wave that propagates through the active region along a main propagation direction, the active region comprising a plurality of p-n junction diodes disposed along the main propagation direction, each of the plurality of p-n junction diodes comprising a p-type stripe and an n-type stripe that are disposed adjacent to one another across the main propagation direction;
    a modulation electrode having a first end and a second end, the modulation electrode extending from the first end of the modulation electrode to the second end of the modulation electrode through the active region along the main propagation direction;
    a bias electrode having a first end and a second end, the bias electrode extending from the first end of the bias electrode to the second end of the bias electrode through the active region along the main propagation direction;
    a radio-frequency (RF) input interface configured to directly couple to an electrical modulation signal;
    a direct-current (DC) bias interface configured to directly couple to a DC bias voltage;
    a power supply interface configured to receive a power supply voltage;
    a resistor;
    a first capacitor; and
    a second capacitor,
    wherein:
        a p-n junction is formed between the p-type stripe and the n-type stripe of each of the plurality of p-n junction diodes,
        the modulation electrode is electrically coupled to the n-type stripe of each of the plurality of p-n junction diodes,
        the bias electrode is electrically coupled to the p-type stripe of each of the plurality of p-n junction diodes,
        the RF input interface is electrically coupled to the first end of the modulation electrode,
        the DC bias interface is electrically coupled to the bias electrode,
        the resistor is electrically coupled between the second end of the modulation electrode and the power supply interface,
        the first capacitor is electrically coupled between the first end of the bias electrode and an electrical ground, and
        the second capacitor is electrically coupled between the second end of the bias electrode and the power supply interface.

2. The monolithic E-O modulator of claim 1, further comprising:
    a voltage generation circuit for generating the DC bias voltage.

3. The monolithic E-O modulator of claim 2, wherein the DC bias voltage is variable via the voltage generation circuit.

4. The monolithic E-O modulator of claim 1, wherein the power supply voltage is in a range of 4-6 volts.

5. The monolithic E-O modulator of claim 1, wherein the plurality of p-n junction diodes is reversely biased.

6. The monolithic E-O modulator of claim 1, wherein the plurality of p-n junction diodes comprises a quantity of 1-100 p-n junction diodes.

7. The monolithic E-O modulator of claim 1, wherein the resistor has a resistance in a range of 30-50 ohms.

8. The monolithic E-O modulator of claim 1, wherein the monolithic E-O modulator is fabricated on a silicon-on-insulator (SOI) substrate, the SOI substrate comprising a bulk silicon substrate, a buried oxide (BOX) layer disposed on top of the bulk silicon substrate, and a top silicon layer disposed on top of the BOX layer.

9. The monolithic E-O modulator of claim 8, wherein the resistor comprises a doped silicon region formed in the top silicon layer.

10. The monolithic E-O modulator of claim 8, wherein each of the first capacitor and the second capacitor comprises a metal-insulator-metal (MIM) region disposed on the SOI substrate.

11. The monolithic E-O modulator of claim 8, wherein the plurality of p-n junction diodes collectively forms a ridge waveguide that accommodates the optical wave, and wherein the ridge waveguide is formed in the top silicon layer.

12. The monolithic E-O modulator of claim 11, wherein a height of the ridge waveguide is in a range of 100-500 nanometers (nm), and a width of the ridge is in a range of 300-700 nm.

13. The monolithic E-O modulator of claim 11, wherein:
the p-type stripe and the n-type stripe of each p-n junction diode are formed in the top silicon layer,
the p-type stripe comprises a P doped region, a P+ doped region disposed adjacent to the P doped region, and a P++ doped region disposed adjacent to the P+ doped region, the n-type stripe comprises an N doped region, an N+ doped region disposed adjacent to the N doped region, and an N++ doped region disposed adjacent to the N+ doped region, and the p-n junction is formed between the P doped region and the N doped region.

14. The monolithic E-O modulator of claim 13, wherein each of the P doped region and the N doped region has a doping concentration in a range of 1 e17-1e18 per cubic centimeter.

15. The monolithic E-O modulator of claim 13, wherein each of the P+ doped region and the N+ doped region has a doping concentration in a range of 1 e18-5e18 per cubic centimeter.

16. The monolithic E-O modulator of claim 13, wherein each of the P++ doped region and the N++ doped region has a doping concentration in a range of 1 e19-1e22 per cubic centimeter.

17. The monolithic E-O modulator of claim 1, wherein:
the bias electrode comprises two conductive stripes disposed in parallel and along the main propagation direction,
each of the two conductive stripes is disposed on a respective side of the modulation electrode, and
the modulation electrode and the two conductive stripes of the bias electrode form a coplanar waveguide (CPW) electrode for conducting the electrical modulation signal.

18. The monolithic E-O modulator of claim 1, wherein:
the modulation electrode comprises two conductive stripes disposed in parallel and along the main propagation direction,
the bias electrode comprises three conductive stripes disposed in parallel and along the main propagation direction,
the two conductive stripes of the modulation electrode are disposed interdigitally among the three conductive stripes of the bias electrode,
the electrical modulation signal comprises a pair of differential signals,
each of the two conductive stripes of the modulation electrode is electrically coupled to a respective differential signal of the pair of differential signals, and
the two conductive stripes of the modulation electrode and the three conductive stripes of the bias electrode form a coplanar waveguide (CPW) electrode for conducting the pair of differential signals.

19. The monolithic E-O modulator of claim 18, wherein:
the resistor comprises two resistive elements, and
each of the two resistive elements is electrically coupled between the power supply interface and a respective one of the two conductive stripes of the modulation electrode.

20. The monolithic E-O modulator of claim 18, wherein the plurality of p-n junction diodes are disposed symmetrically with respect to the CPW electrode.

* * * * *